United States Patent
Kim et al.

(10) Patent No.: US 9,165,401 B1
(45) Date of Patent: Oct. 20, 2015

(54) MULTI-PERSPECTIVE STEREOSCOPY FROM LIGHT FIELDS

(71) Applicant: Disney Enterprises, Inc., Burbank, CA (US)

(72) Inventors: Changil Kim, Zurich (CH); Alexander Sorkine Hornung, Zurich (CH); Ulrich Mueller, Burbank, CA (US); Yael Pritch, Cupertino, CA (US); Henning Zimmer, Zurich (CH); Markus Gross, Uster (CH)

(73) Assignees: DISNEY ENTERPRISES, INC., Burbank, CA (US); ETH ZÜRICH (EIDGENÖESSISCHE TECHNISCHE HOCHSCHULE ZÜRICH), ZÜRICH (CH)

( * ) Notice: Subject to any disclaimer, the term of this patent is extended or adjusted under 35 U.S.C. 154(b) by 0 days.

(21) Appl. No.: 14/156,368

(22) Filed: Jan. 15, 2014

Related U.S. Application Data

(63) Continuation-in-part of application No. 13/317,658, filed on Oct. 24, 2011, now Pat. No. 9,113,043.

(51) Int. Cl.
*G06T 15/50* (2011.01)
(52) U.S. Cl.
CPC .................... *G06T 15/50* (2013.01)
(58) Field of Classification Search
CPC ............... H04N 7/18; H04N 13/0048
See application file for complete search history.

(56) References Cited

U.S. PATENT DOCUMENTS

| | | | |
|---|---|---|---|
| 4,302,097 A * | 11/1981 | Chlestil | 355/52 |
| 5,101,442 A | 3/1992 | Amir | |
| 5,747,822 A | 5/1998 | Sinclair et al. | |
| 5,847,832 A | 12/1998 | Liskow et al. | |
| 8,228,417 B1 * | 7/2012 | Georgiev et al. | 348/340 |
| 8,244,058 B1 | 8/2012 | Intwala et al. | |
| 8,315,476 B1 | 11/2012 | Georgiev et al. | |
| 8,400,555 B1 | 3/2013 | Georgiev et al. | |
| 8,581,929 B1 | 11/2013 | Maguire, Jr. | |
| 8,625,931 B2 * | 1/2014 | Hadap et al. | 382/285 |
| 8,749,620 B1 * | 6/2014 | Knight et al. | 348/49 |

(Continued)

OTHER PUBLICATIONS

Mendiburu, B., "3D Movie Making: Stereoscopic Digital Cinema from Script to Screen," Focal Press, 2009, 4 pages.

(Continued)

*Primary Examiner* — Richard Torrente
*Assistant Examiner* — Irfan Habib
(74) *Attorney, Agent, or Firm* — Kilpatrick Townsend & Stockton LLP

(57) ABSTRACT

Methods and systems for generating stereoscopic content with granular control over binocular disparity based on multi-perspective imaging from representations of light fields are provided. A reference image, a three-dimensional ("3D") representation of a light field corresponding to the reference image, and a goal disparity image that indicates a goal binocular disparity for one or more pixels of the reference image may be received. For each pixel of an output image corresponding to the reference image, a point within the light field that is a closest match for the goal binocular disparity of a corresponding pixel of the goal disparity image may be determined. A stereoscopic image pair including the reference image and the output image may be generated.

22 Claims, 17 Drawing Sheets
(14 of 17 Drawing Sheet(s) Filed in Color)

(56) References Cited

U.S. PATENT DOCUMENTS

| | | | |
|---|---|---|---|
| 8,908,016 B2* | 12/2014 | Gordon et al. | 348/49 |
| 2004/0222989 A1* | 11/2004 | Zhang et al. | 345/426 |
| 2008/0043096 A1* | 2/2008 | Vetro et al. | 348/51 |
| 2008/0106746 A1* | 5/2008 | Shpunt et al. | 356/610 |
| 2009/0268970 A1* | 10/2009 | Babacan et al. | 382/232 |
| 2010/0118118 A1 | 5/2010 | Krah | |
| 2010/0118126 A1 | 5/2010 | Park et al. | |
| 2010/0149317 A1 | 6/2010 | Matthews | |
| 2010/0201719 A1 | 8/2010 | Kimura | |
| 2011/0018903 A1 | 1/2011 | Lapstun et al. | |
| 2011/0050864 A1 | 3/2011 | Bond | |
| 2011/0193864 A1 | 8/2011 | Zwart et al. | |
| 2012/0044281 A1* | 2/2012 | Kang | 345/690 |
| 2012/0098932 A1 | 4/2012 | Kim et al. | |
| 2012/0147205 A1* | 6/2012 | Lelescu et al. | 348/218.1 |
| 2012/0206573 A1* | 8/2012 | Dokor et al. | 348/46 |
| 2012/0218256 A1 | 8/2012 | Murray et al. | |
| 2012/0249746 A1 | 10/2012 | Cornog et al. | |
| 2012/0281072 A1 | 11/2012 | Georgiev et al. | |
| 2013/0038696 A1 | 2/2013 | Ding et al. | |
| 2013/0077880 A1* | 3/2013 | Venkataraman et al. | 382/232 |
| 2013/0113891 A1 | 5/2013 | Mayhew et al. | |
| 2013/0121615 A1* | 5/2013 | Intwala et al. | 382/280 |
| 2013/0128087 A1 | 5/2013 | Georgiev et al. | |
| 2013/0136299 A1* | 5/2013 | Kim et al. | 382/103 |
| 2013/0155050 A1 | 6/2013 | Rastogi et al. | |
| 2013/0169749 A1 | 7/2013 | Zhou et al. | |
| 2013/0215108 A1* | 8/2013 | McMahon et al. | 345/419 |
| 2013/0215235 A1* | 8/2013 | Russell | 348/47 |
| 2013/0222606 A1 | 8/2013 | Pitts et al. | |
| 2013/0222633 A1 | 8/2013 | Knight et al. | |
| 2013/0308135 A1 | 11/2013 | Dubois et al. | |
| 2014/0079336 A1* | 3/2014 | Venkataraman et al. | 382/275 |
| 2014/0092281 A1* | 4/2014 | Nisenzon et al. | 348/262 |
| 2014/0232822 A1* | 8/2014 | Venkataraman et al. | 348/43 |

OTHER PUBLICATIONS

Adelson, et al., "The plenoptic function and the elements of early vision," Computational Models of Usual Processing, 1991, 20 pages.

Adelson, et al., "Single lens stereo with a plenoptic camera," IEEE Transactions on Pattern Analysis and Machine Intelligence, 1992, vol. 14, No. 2, pp. 99-106.

Agrawal, et al., "Gradient domain manipulation techniques in vision and graphics,"ICCV Courses, 2007, 106 pages.

Boykov, et al., "An experimental comparison of min-cut/max-flow algorithms for energy minimization in vision,"IEEE Trans. Pattern Anal. Mach Intell., 2004, vol. 26, No. 9, pp. 1124-1137.

Boykov, et al., "Fast approximate energy minimization via graph cuts," IEEE Trans. Pattern Anal. Mach. Intell., 2001, vol. 23, No. 11, pp. 1222-1239.

Chai, et al., "Plenoptic sampling," SIGGRAPH, 2000, pp. 307-318.

Feldmann, et al., "Nonlinear depth scaling for immersive video applications,"Proceedings of WIAMIS, 2003, 6 pages.

Georgiev, et al., "Spatio-angular resolution trade-offs in integral photography," Rendering Techniques: 17th Eurographics Workshop on Rendering, 2006, 10 pages.

Gortler, et al., "The lumigraph," SIGGRAPH, 1996, pp. 43-54.

Halle, M., "Multiple viewpoint rendering," Proceedings of SIGGRAPH 98, Computer Graphics Proceedings, Annual Conference Series, 1998, 12 pages.

Hartley, et al, "Linear pushbroom cameras," IEEE Transactions on Pattern Analysis and Machine Intelligence, 1997, vol. 19, No. 9, pp. 963-975.

Holliman, N., "Mapping perceived depth to regions of interest in stereoscopic images," Stereoscopic Displays and Applications XV, Proceedings of SPIE, 2004, vol. 5291. pp. 117-128.

Jones, et al., "Controlling perceived depth in stereoscopic images," Stereoscopic Displays and Virtual Systems VIII, Proceedings of SPIE, 2001, vol. 4297, pp. 42-53.

Kang, et al., "Extracting view-dependent depth maps from a collection of images,"IJCV, 2004, vol. 58, No. 2, pp. 139-163.

Kim, et al., "Depth scaling of multiview images for automultiscopic 3d monitors,"3DTV Conference, 2008, pp. 181-184.

Kohli, et al., "Dynamic graph cuts and their applications in computer vision,"Computer Vision: Detection, Recognition and Reconstruction, 2010, pp. 51-108.

Lang, et al., "Nonlinear disparity mapping for stereoscopic 3d," ACM Transactions on Graphics, Jul. 2010, vol. 29, No. 4, 10 pages.

Levoy, et al., "Light field rendering, in SIGGRAPH," 1996, pp. 31-42.

Ng, et al., "Light field photography with a hand-held plenoptic camera," Stanford University Computer Science Technical Report CSTR, 2005, 11 pages.

Pajdla, T., "Geometry of two-slit camera," Research Report CTU-CMP-2002-02, 2002, Czech Technical University, Prague, 21 pages.

Peleg, et al., "Panoramic stereo imaging," IEEE Transactions on Pattern Analysis and Machine Intelligence, 2001, vol. 23, No. 3, pp. 279-290.

Rademacher, et al., "Multiple-center-of-projection images," Proceedings of SIGGRAPH,98, Computer Graphics Proceedings, Annual Conference Series, 1998, pp. 199-206.

Rubinstein, et al., "Improved seam carving for video retargeting," ACM Trans. Graph, 2008, vol. 27, No. 3, 10 pages.

Seitz, S., "The space of all stereo images," IEEE International Conference on Computer Vision, 2001, vol. 1, pp. 26-33.

Shum, et al., "Rendering with concentric mosaics," Proceedings of SIGGRAPH, 99, Computer Graphics Proceedings, Annual Conference Series, 1999, pp. 299-306.

Thomas, et al., "Disney Animation: The Illusion of Life," Hyperion, Los Angeles, 1995, 3 pages.

Veeraraghavan, et al., "Dappled photography: mask enhanced cameras for heterodyned light fields and coded aperture refocusing," ACM Trans. Graph., 2007, vol. 26, No. 3, 12 pages.

Ward, et al., "Depth director: A system for adding depth to movies," IEEE CG&A, Jan./Feb. 2011, vol. 31, No. 1, pp. 36-48.

Wilburn, et al., "High performance imaging using large camera arrays," ACM Transactions on Graphics, Aug. 2005, vol. 24, No. 3, pp. 765-776.

Wood, et al., Multiperspective panoramas for cel animation, Proceedings of SIGGRAPH, 97, Computer Graphics Proceedings, Annual Conference Series, 1997, pp. 243-250.

Yang, et al., "A real-time distributed light field camera," Rendering Techniques 2002: 13th Eurographics Workshop on Rendering, 2002, pp. 77-86.

Yu, et al., "General linear cameras," 8th European Conference on Computer Vision (ECCV 2004), 2004, pp. 14-27.

Yu, et al., "Towards multi-perspective rasterization," The Visual Computer, May 2009, vol. 25, No. 5-7, pp. 549-557.

Yu, et al., "Multi-perspective modelling, rendering and imaging," Computer Graphics Forum, 2010, vol. 29, No. 1, pp. 227-246.

Zomet, et al., "Mosaicing new views: the crossed-slits projection," IEEE Transactions on Pattern Analysis and Machine Intelligence, 2003, vol. 25, pp. 741-754.

Zwicker, et al., "Antialiasing for automultiscopic 3d displays," Rendering Techniques 2006: 17th Eurographics Workshop on Rendering, 2006, pp. 73-82.

Bowles, H., et al, "Iterative image warping," Comput. Graph. Forum, 2012, vol. 31(2), pp. 237-246.

Buehler, C., et al., "Unstructured lumigraph rendering," in SIGGRAPH, 2001, pp. 425-432.

Chambolle, A., et al., "An introduction to total variation for image analysis,"Theoretical foundations and numerical methods for sparse recovery, 2010, vol. 9, pp. 263-340.

Chan, T. F., et al., "Algorithms for finding global minimizers of image segmentation and denoising models," SIAM Journal on Applied Mathematics, 2006, vol. 66(5), pp. 1632-1648.

Didyk, P., et al., "Adaptive image-space stereo view synthesis," in VMV, 2010, pp. 299-306.

Didyk, P., et al., "A perceptual model for disparity," ACM Trans. Graph., 2011, vol. 30(4), p. 96.

Fleming, W. H. and Rishel, R., "An integral formula for total gradient variation,"Archiv der Mathematik, 1960, vol. 11(1), pp. 218-222.

(56) References Cited

OTHER PUBLICATIONS

Handa, A., et al., "Applications of legendre-fenchel transformation to computer vision problems," Technical Report DTR11-7, Imperial College, Department of Computing, Sep. 2011.

Ishikawa, H., "Exact optimization for markov random fields with convex priors,"IEEE Trans. Pattern Anal. Mach. Intell., 2003, vol. 25(10), pp. 1333-1336.

Kim, C., et al., "Multi-perspective stereoscopy from light fields," ACM Trans. Graph., Dec. 2011, vol. 30(6), pp. 190:1-190:10.

Pock, T., et al., "Global solutions of variational models with convex regularization,"SIAM J. Imaging Sciences, 2010, vol. 3(4), pp. 1122-1145.

Pock, T., et al., "A convex formulation of continuous multi-label problems," In ECCV, 2008, pp. 792-805.

Rudin, L.I., et al., "Nonlinear total variation based noise removal algorithms,"Physica D: Nonlinear Phenomena, 1992, vol. 60(1), pp. 259-268.

Shum, H. and Kang, S.B., "Review of image-based rendering techniques," In VCIP, 2000, pp. 2-13.

Wang, O., et al., "Stereobrush: Interactive 2d to 3d conversion using discontinuous warps," In SBM, 2011, pp. 47-54.

Zach, C., et al., "Continuous maximal flows and wulff shapes: Application to mrfs,"In CVPR, 2009, pp. 1911-1918.

Gallup et al. "Piecewise Planar and Non-Planar Stereo for Urban Scene Reconstruction", 978-1-4224-6985-7/10, IEEE, pp. 1418-1425.

Final Office Action mailed Jul. 3, 2014, in U.S. Appl. No. 13/317,658, filed Oct. 24, 2011, 18 pages.

Non-final Office Action, dated Oct. 23, 2014, in U.S. Appl. No. 13/317,658, 15 pages.

Notice of Allowance, dated Apr. 7, 2015, in U.S. Appl. No. 13/317,658, 10 pages.

\* cited by examiner

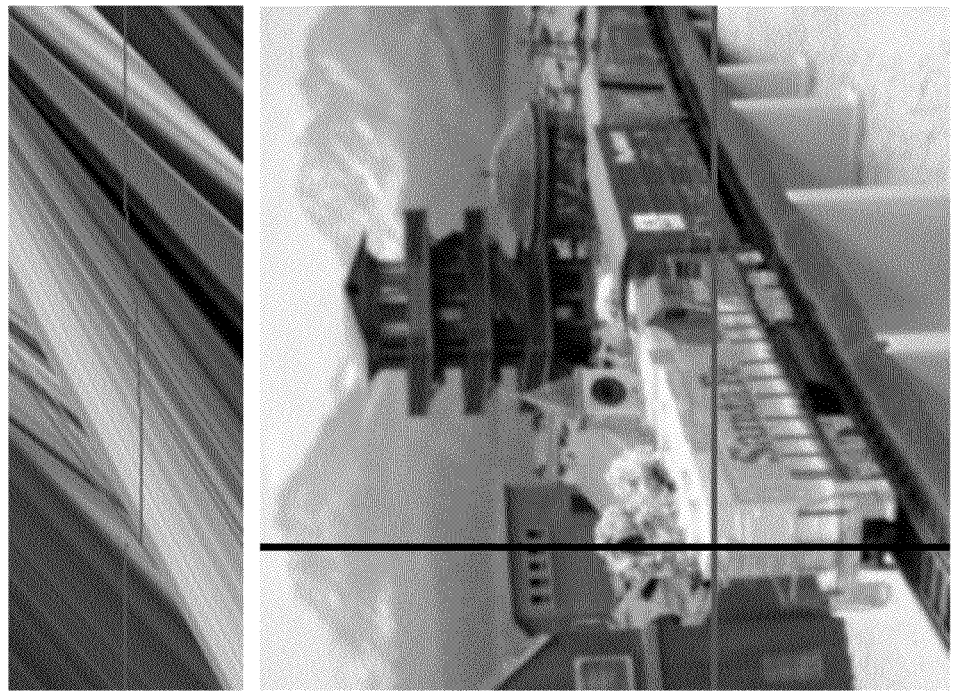
FIG. 3(b)
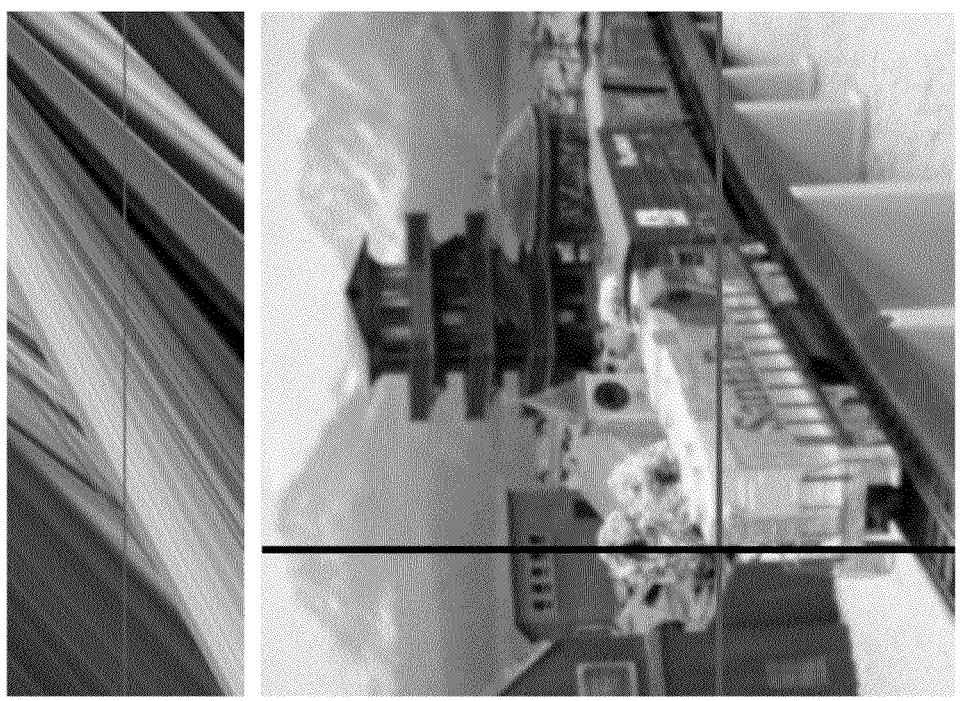
FIG. 3(a)
FIG. 3

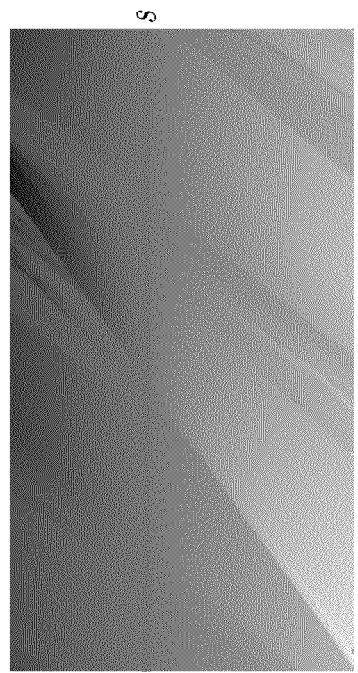
FIG. 5(b)
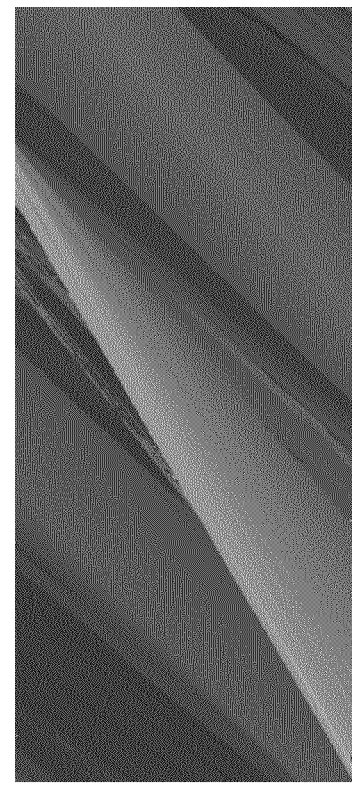
FIG. 5(a)
FIG. 5

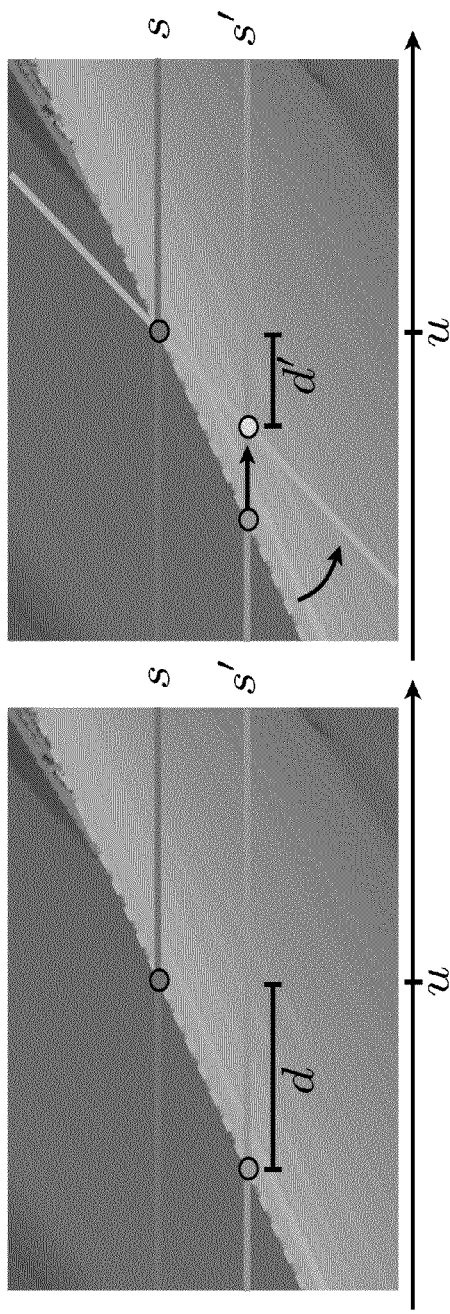
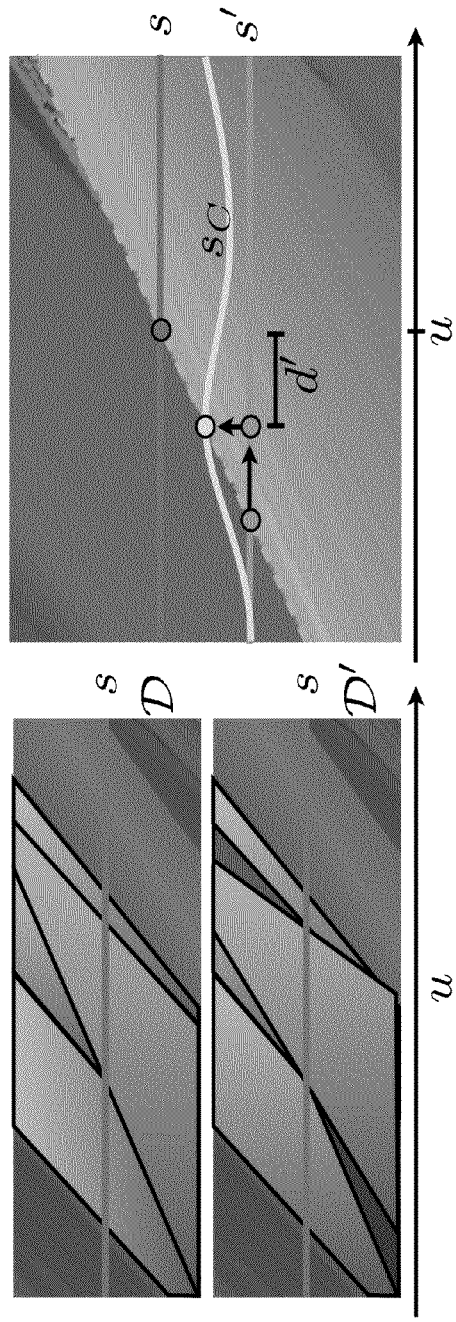
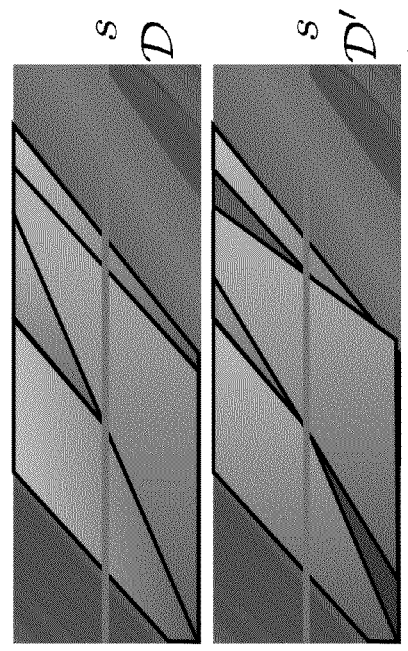
FIG. 6
FIG. 6(a)
FIG. 6(b)
FIG. 6(c)
FIG. 6(d)

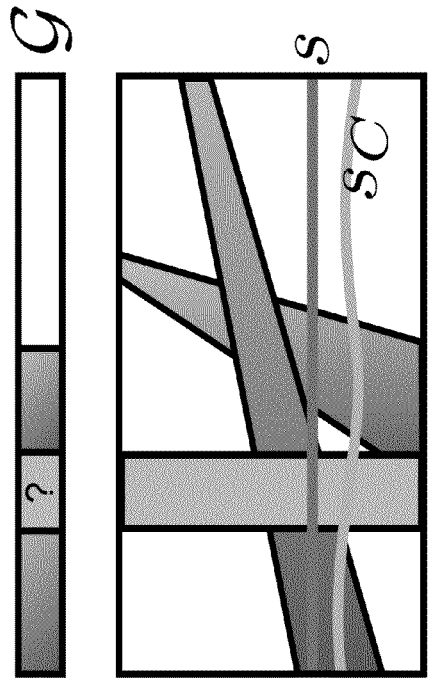
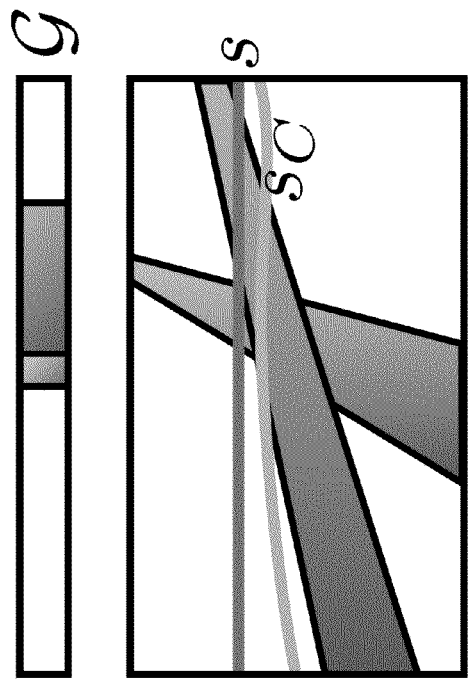
Fig. 8(a)
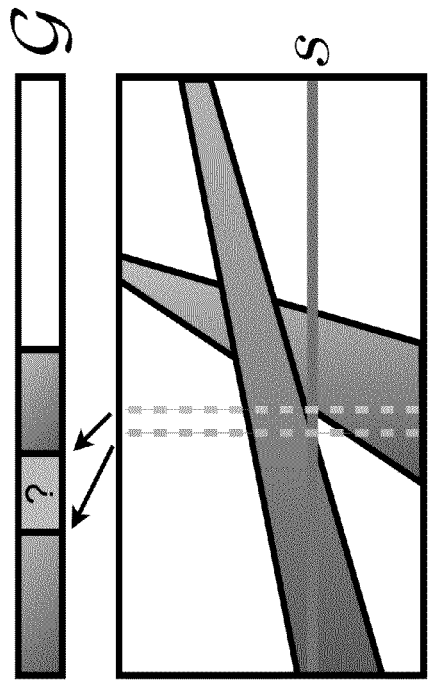
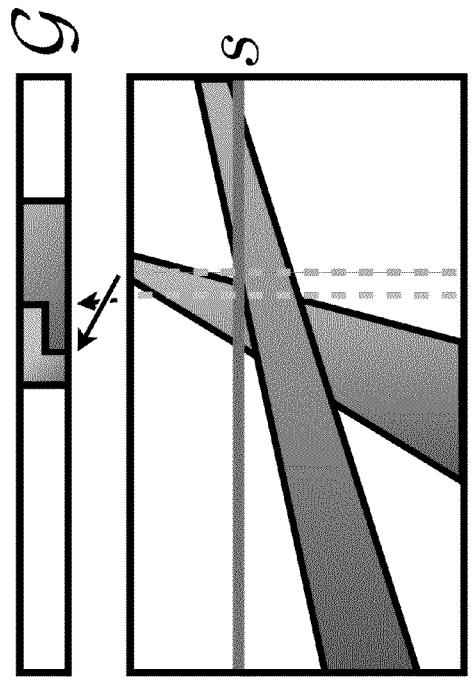
Fig. 8(b)
FIG. 8

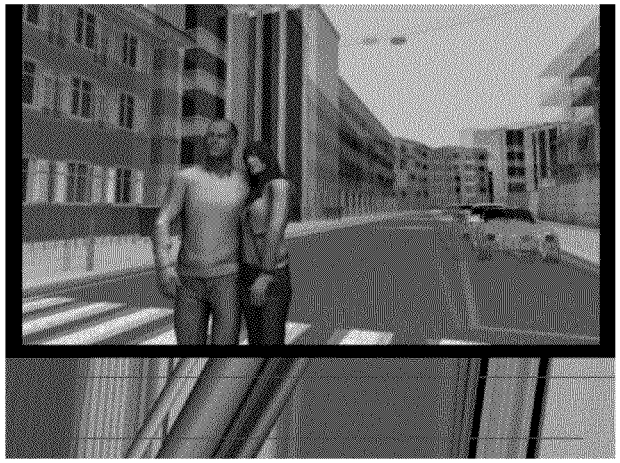
Fig. 9(a)
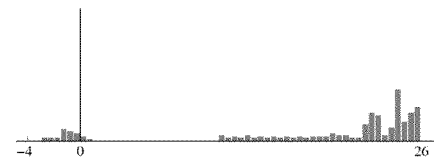
Fig. 9(d)
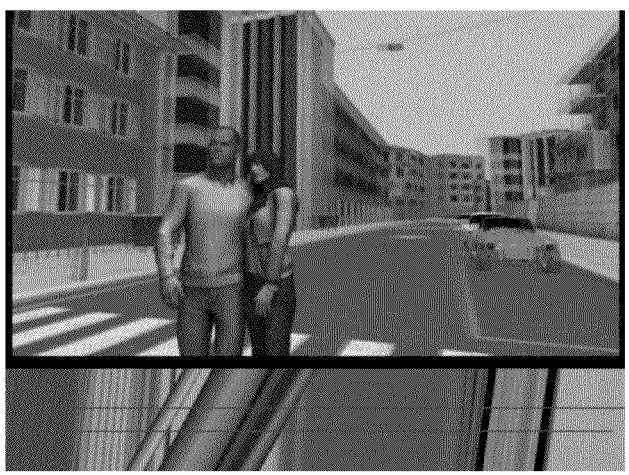
Fig. 9(b)
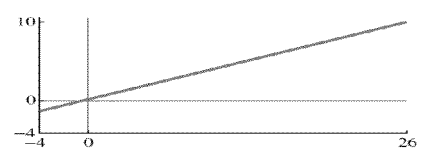
Fig. 9(e)
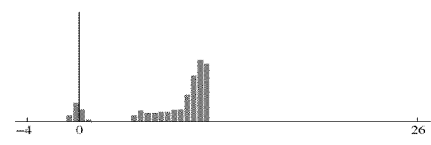
Fig. 9(f)
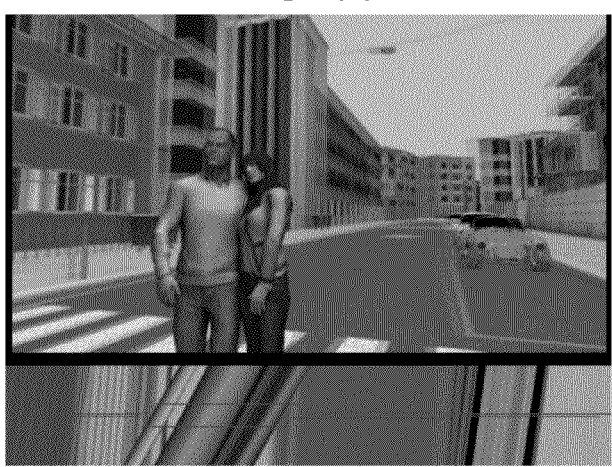
Fig. 9(c)
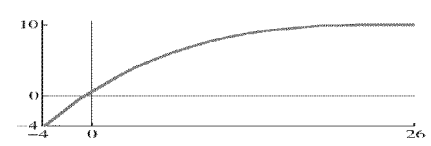
Fig. 9(g)
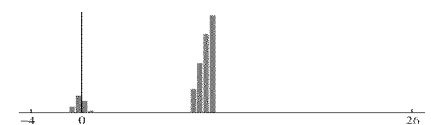
Fig. 9(h)
FIG. 9

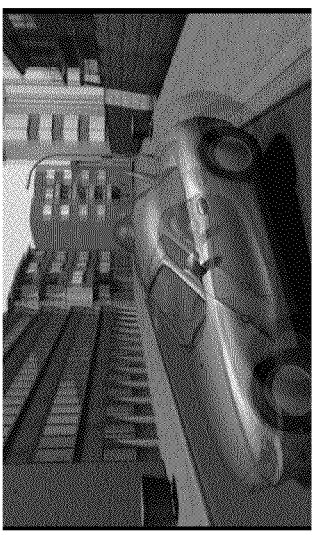
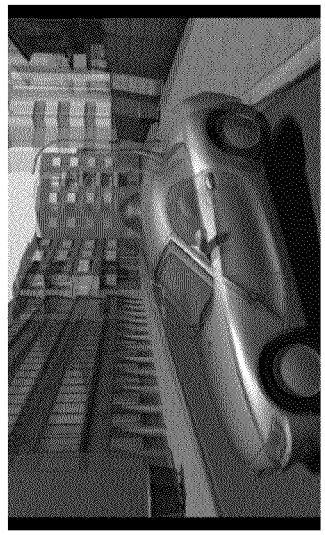
Fig. 10(a)
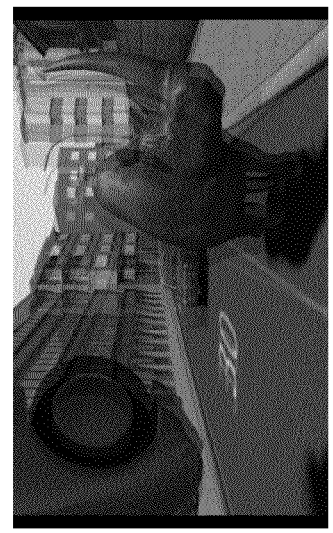
Fig. 10(b)
Fig. 10(c)
FIG. 10

MULTI-PERSPECTIVE STEREOSCOPY FROM LIGHT FIELDS

CROSS-REFERENCE TO RELATED APPLICATIONS

This application is a continuation-in-part of U.S. application Ser. No. 13/317,658 filed Oct. 24, 2011, entitled "Multi-Perspective Stereoscopy from Light Fields," the disclosures of which are incorporated by reference herein in their entirety.

BACKGROUND

The present invention relates to image generation, and in particular to methods and apparatus for generating stereoscopic image pairs based on multi-perspective imaging from a light field.

Three-dimensional ("3D") television, movies, and games and displays for other purposes have been gaining more and more popularity both within the entertainment industry and among consumers. An ever increasing amount of content is being created, distribution channels including live-broadcast are being developed, and 3D monitors and TV sets are being sold in all major electronic stores.

One approach to 3D imagery is to generate a stereoscopic image pair where one image of the pair is provided to the viewer's left eye and the other image of the pair is provided to the viewer's right eye with something to eliminate or lessen cross-over. Where the images in the image pair are related (e.g., captured from the same scene) but different, those differences are interpreted by the viewer's brain as depth information, thus creating 3D effects. The image pair might be of a physical scene, where light from objects in the scene are captured by a camera or other optical sensor, and the stereoscopic effect is generated by capturing the scene imagery using two cameras offset by some baseline amount. The image pair might be of a virtual scene, such as a scene generated entirely using computer processing and/or geometric models.

Binocular parallax (i.e., binocular disparity) is one cue that stereoscopic image generation systems use for generating stereoscopic scene perception. In stereography, one common method for controlling the amount of binocular parallax is based on setting the baseline, or the inter-axial distance, of two cameras prior to image acquisition. However, the range of admissible baselines is quite limited, since most scenes exhibit more disparity than humans can tolerate when viewing the content on a stereoscopic display. Reducing the baseline of cameras decreases the amount of binocular disparity, but it also causes scene elements to appear overly flat.

Another, more sophisticated, approach to disparity control requires remapping image disparities (or remapping the depth of scene elements) and re-synthesizing new images. However, this approach typically requires accurate disparity computation and hole filling (filling in gaps that appear in the image because scene elements are moved in the re-synthesized views). For computer-generated images, depth remapping of scene elements implies severe changes of lighting, shading, and the scene composition in general.

The computer graphics and computer vision community has studied the geometry and applications of multi-perspective imaging, for example [Wood et al. 1997] describe a computer-assisted method to compute multi-perspective panoramas from a collection of perspective images, and employed multi-perspective imaging in movie production in order to provide a richer and more complete visualization of stereoscopic contents, for example for drawing backgrounds for two-dimensional ("2D") cell animation [Thomas and Johnston 1995]. In the recent years, many types of multi-perspective cameras and corresponding images have been introduced. Examples include push-broom cameras [Hartley and Gupta 1997] and related Multiple-Center-of-Projection Images [Rademacher and Bishop 1998], cross slit cameras [Pajdla 2002; Zomet et al. 2003], or general linear cameras [Yu and McMillan 2004]. However, creating a richer and perceptually pleasing multi-perspective stereoscopic content without any specific camera model remains a difficult problem.

It has been shown that remapping binocular disparities may be used to refine and optimize stereoscopic content for display on different output devices or according to user preferences. A number of technical approaches for disparity remapping for stereoscopic content have been proposed. [Jones et al. 2001] analyze the scene depth range and adjust the stereoscopic camera baseline to a given disparity budget. Feldman et al. [2003] present a system that uses a nonlinear depth-scaling for transmitting a three-dimensional (3D) scene to be rendered from multiple views. [Holliman 2004] describes a system that compresses the scene depth for stereoscopic displays by identifying a region of interest and compressing it differently compared to the rest of the scene. Koppal et al. [2011] discusses optimal stereo and describes basic post-processing tools with their main focus on shot planning during capture. Ward et al. [2011] proposed a system for 2D-to-3D conversion that relies on image warping and requires manual interaction. [Kim et al. 2008] discuss how to perform non-linear depth remapping for multi-view autostereoscopic displays. [Zwicker et al. 2006] present a remapping and a pre-filtering framework for automultiscopic displays that adapts an in-put light field to the display capabilities.

All these works, however, are restricted in the type of disparity remapping operators they support. In particular, they do not provide a solution for detailed control of disparity in real world images. Although a nonlinear and local disparity remapping to control and retarget the depth of a stereoscopic content has been presented by [Lang et al. 2010], this method is limited in amount of remapping that it applied without producing noticeable distortions of the image content. In particular, this method causes salient scene structures to bend (e.g., straight lines) and fails to allow for per-pixel disparity control.

Accordingly, it is desirable to develop methods and systems to overcome the aforementioned deficiencies to have per-pixel disparity control by selecting actual light rays from an input light field instead of using image deformations or inpainting.

REFERENCES

[Adelson and Bergen 1991] Adelson, E., and Bergen, J., The plenoptic function and the elements of early vision, Computational Models of Usual Processing, 1991

[Adelson and Wang 1992] Adelson, E. H., and Wang, J., Single lens stereo with a plenoptic camera, IEEE Transactions on Pattern Analysis and Machine Intelligence, 14, 2, 99-106, 1992

[Agrawal and Raskar 2007] Agrawal, A., and Raskar, R., Gradient domain manipulation techniques in vision and graphics, In ICCV Courses, 2007

[Boykov and Kolmogorov 2004] Boykov, Y., and Kolmogorov, V., An experimental comparison of min-cut/max-flow algorithms for energy minimization in vision, IEEE Trans. Pattern Anal. Mach Intell., 26, 9,1124-1137, 2004

[Boykov et al. 2001] Boykov, Y., Veksler, O., and Zabih, R., Fast approximate energy minimization via graph cuts, IEEE Trans. Pattern Anal. Mach. Intell., 23, 11, 1222-1239, 2001

[Chai et al. 2000] Chai, J., Chan, S.-C., Shum, H.-Y., and Tong, X., Plenoptic sampling, In SIGGRAPH, 307-318, 2000.

[Chambolle et al. 2010] A. Chambolle, V. Caselles, D. Cremers, M. Novaga, and T. Pock. An introduction to total variation for image analysis. Theoretical foundations and numerical methods for sparse recovery, 9:263-340, 2010.

[Chan et al. 2006] T. F. Chan, S. Esedoglu, and M. Nikolova. Algorithms for finding global minimizers of image segmentation and denoising models. SIAM Journal on Applied Mathematics, 66(5):1632-1648, 2006.

[Feldmann et al. 2003] Feldmann, L, Schreer, 0., and Kauff, P., Nonlinear depth scaling for immersive video applications, In Proceedings of WIAMIS, 2003

[Fleming and Rishel 1960] W. H. Fleming and R. Rishel. An integral formula for total gradient variation. Archiv der Mathematik, 11(1):218-222, 1960.

[Georgiev et al. 2006] Georgiev, T., Zheng, C., Nayar, S., Curless, B., Salesin, D., and Intwala, C., Spatio-angular resolution trade-offs in integral photography, In Rendering Techniques: 17th Eurographics Workshop on Rendering, 2006

[Gortler et al. 1996] Gortler, S. J., Grzeszczuk, R., Szeliski, R., and Cohen, M. F., The lumigraph, In SIGGRAPH, 43-54, 1996

[Halle 1998] Halle, M., Multiple viewpoint rendering, In Proceedings of SIGGRAPH 98, Computer Graphics Proceedings, Annual Conference Series, 243 254, 1998

[Handa et al. 2011] A. Handa, R. A. Newcombe, A. Angeli, and A. J. Davison. Applications of legendre-fenchel transformation to computer vision problems. Technical Report DTR11-7, Imperial College—Department of Computing, September 2011

[Hartley and Gupta 1997] Hartley, R. L, and Gupta, R., Linear pushbroom cameras, IEEE Transactions on Pattern Analysis and Machine Intelligence, 19, 9, 963-975, 1997

[Holliman 2004] Holliman, N., Mapping perceived depth to regions of interest in stereoscopic images, In Stereoscopic Displays and Applications XV, Proceedings of SPIE, Vol. 5291, 117-128, 2004

[Jones et al. 2001] Jones, G., Lee, D., Holliman, N., and Ezra, D., Controlling perceived depth in stereoscopic images, In Stereoscopic Displays and Virtual Systems VIII, Proceedings of SPIE, Vol. 4297, 42-53, 2001

[Kang and Szeliski 2004] Kang, S. B., and Szeliski, R., Extracting view-dependent depth maps from a collection of images, IJCV 58, 2, 139-163, 2004

[Kim et al. 2008] Kim, M., Lee, S., Choi, C., Um, G.-M., Hur, N., and Kim, J., Depth scaling of multiview images for automultiscopic 3d monitors, in 3DTV Conference, 181-184, 2008

[Kohli and Torr 2010] Kohli, P., and Torr, P. H. S., Dynamic graph cuts and their applications in computer vision, In Computer Vision: Detection, Recognition and Reconstruction, 51-108, 2010

[Lang et al. 2010] Lang, M., Hornung, A., Wang, O., Poulakos, S., Smolic, A., and Gross, M., Nonlinear disparity mapping for stereoscopic 3d, ACM Transactions on Graphics, 29, 4 (July), 75:1 75:10, 2010

[Levoy and Hanrahan 1996] Levoy, M., and Hanrahan, P., Light field rendering, In SIGGRAPH, 31-42, 1996

[Mendiburu 2009] Mendiburu, B., 3D Movie Making: Stereoscopic Digital Cinema from Script to Screen, Focal Press, 2009

[Ng et al. 2005] Ng, R., Levoy, M., Brédif, M., Duval, G., Horowitz, M., and Hanrahan, P., Light field photography with a hand-held plenoptic camera, Stanford University Computer Science Technical Report CSTR, 2005-02, 2005

[Pajdla 2002] Pajdla, T., Geometry of two-slit camera, Research Report CTU-CMP-2002-02, Czech Technical University, Prague, 2002

[Peleg et al. 2001] Peleg, S., Ben-Ezra, M., and Pritch, Y., Omnistereo: Panoramic stereo imaging, IEEE Transactions on Pattern Analysis and Machine Intelligence, 23, 3, 279-290, 2001

[Pock et al. 2010] T. Pock, D. Cremers, H. Bischof, and A. Chambolle. Global solutions of variational models with convex regularization. SIAM J. Imaging Sciences, 3(4): 1122-1145, 2010.

[Pock et al. 2008] T. Pock, T. Schoenemann, G. Graber, H. Bischof, and D. Cremers. A convex formulation of continuous multi-label problems. In ECCV, pages 792-805, 2008.

[Rademacher 1998] Rademacher, P., and Bishop, G., Multiple-center-of-projection images, In Proceedings of SIGGRAPH, 98, Computer Graphics Proceedings, Annual Conference Series, 199-206, 1998

[Rubinstein et al. 2008] Rubinstein, M., Shamir, A., and Avidan, S., Improved seam carving for video retargeting, ACM Trans. Graph, 27, 3, 2008

[Rudin 1992] L. I. Rudin, S. Osher, and E. Fatemi. Nonlinear total variation based noise removal algorithms. Physica D: Nonlinear Phenomena, 60(1):259-268, 1992.

[Seitz 2001] Seitz, S., The space of all stereo images, In IEEE International Conference on Computer Vision, vol. 1, 26-33, 2001

[Shum and He 1999] Shum, H.-Y., and He, L.-W., Rendering with concentric mosaics, In Proceedings of SIGGRAPH, 99, Computer Graphics Proceedings, Annual Conference Series, 299-306, 1999

[Thomas and Johnston 1995] Thomas, F., and Johnston, O., Disney Animation: The Illusion Of Life, Hyperion, Los Angeles, 1995

[Veeraraghavan 2007] Veeraraghavan, A., Raskar, R., Agrawal, A. K., Mohan, A., and Tumblin, J., Dappled photography: mask enhanced cameras for heterodyned light fields and coded aperture refocusing, ACM Trans. Graph., 26, 3. 2007

[Ward et al. 2011] WARD, B., KANG, S. B., AND BENNETT, E. P., Depth director: A system for adding depth to movies. IEEE CG&A 31, 1, 36-48.

[Wilburn et al. 2005] Wilburn, B., Joshi, N., Vaish, V., Talvala, E.-V., Antunez, E., Barth, A., Adams, A., Horowitz, M., and Levoy, M., High performance imaging using large camera arrays, ACM Transactions on Graphics, 24, 3 (August), 765-776, 2005

[Wood 1997] Wood, D. N., Finkelstein, A., Hughes, J. F., Thayer, C. E., and Salesin, D. H., Multiperspective panoramas for cel animation, In Proceedings of SIGGRAPH, 97, Computer Graphics Proceedings, Annual Conference Series, 243-250, 1997

[Yang et al. 2002] Yang, J. C., Everett, M., Buehler, C., and McMillan, L., A real-time distributed light field camera, In Rendering Techniques 2002: 13th Eurographics Workshop on Rendering, 77-86, 2002

[Yu and McMillan 2004] Yu, J., and McMillan, L., General linear cameras, In 8th European Conference on Computer Vision (ECCV 2004), 14-27, 2004

[Yu et al. 2009] Yu, X., Yu, J., and McMillan, L., Towards multi-perspective rasterization, The Visual Computer, 25, 5-7 (May), 549-557, 2009

[Yu et al. 2010] Yu, J., McMillan, L., and Sturm, P., Multi-perspective modelling, rendering and imaging, Computer Graphics Forum, 29, 1, 1, 227 246, 2010

[Zach et al. 2009] C. Zach, M. Niethammer, and J.-M. Frahm. Continuous maximal flows and wulff shapes: Application to mrfs. In CVPR, pages 1911-1918, 2009.

[Zomet et al. 2003] Zomet, A., Feldman, D., Peleg, S., and Weinshall, D., Mosaicing new views: the crossed-slits projection, IEEE Transactions on Pattern Analysis and Machine Intelligence, 25, 61741-754, 2003

[Zwicker 2006] Zwicker, M., Matusik, W., Durand, F., and Pfister, H., Antialiasing for automultiscopic 3d displays, In Rendering Techniques 2006: 17th Eurographics Workshop on Rendering, 73-82, 2006

BRIEF SUMMARY OF EXEMPLARY EMBODIMENTS

Methods and systems for stereoscopic content generation with granular control over binocular disparity based on multi-perspective imaging from representations of light fields are provided.

In some embodiments, a method of generating stereoscopic content from a 3D representation of a light field is provided. The method typically includes receiving a reference image, three-dimensional ("3D") representation of a light field corresponding to the reference image, and a goal disparity image that indicates a goal binocular disparity for one or more pixels of the reference image. For each pixel of an output image corresponding to the reference image, a point within the light field that is a closest match for the goal binocular disparity of a corresponding pixel of the goal disparity image may be determined. A stereoscopic image pair including the reference image and the output image may be generated.

In other embodiments, a computer-implemented system is provided. The computer-implemented system may include one or more data processors and one or more non-transitory computer-readable storage media containing instructions configured to cause the one or more processors to perform operations. The operations can include receiving a reference image, three-dimensional ("3D") representation of a light field corresponding to the reference image, and a goal disparity image that indicates a goal binocular disparity for one or more pixels of the reference image. For each pixel of an output image corresponding to the reference image, a point within the light field that is a closest match for the goal binocular disparity of a corresponding pixel of the goal disparity image may be determined. A stereoscopic image pair including the reference image and the output image may be generated.

In further embodiments, a non-transitory computer-readable medium is provided. The non-transitory computer-readable medium may contain program code that, when executed by a computer, generates stereoscopic content from a three-dimensional light field. The program code may include program code for receiving a reference image, three-dimensional ("3D") representation of a light field corresponding to the reference image, and a goal disparity image that indicates a goal binocular disparity for one or more pixels of the reference image. The program code may also include program code for determining, for each pixel of an output image corresponding to the reference image, a point within the light field that is a closest match for the goal binocular disparity of a corresponding pixel of the goal disparity image. The program code may additionally include program code for generating a stereoscopic image pair including the reference image and the output image.

The following detailed description together with the accompanying drawings will provide a better understanding of the nature and advantages of the present invention.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

In order to more fully understand the present invention, reference is made to the accompanying drawings. Understanding that these drawings are not to be considered limitations in the scope of the invention, the presently described embodiments and the presently understood best mode of the invention are described with additional detail through use of the accompanying drawings.

FIG. 1 comprises FIGS. 1(a)-1(d).

FIG. 2 comprises FIGS. 2(a) and 2(b).

FIG. 3 illustrates examples of a planar single perspective surface cut of the light field and a non-planar multi-perspective surface cut of the light field; FIG. 3 comprises FIGS. 3(a)-3(b).

FIG. 5 illustrates an example 2D u-s-slice of a normalized disparity volume D and an example 2D u-s-slice of a true image disparity volume with respect to a reference view Is; FIG. 5 comprises FIGS. 5(a) and 5(b).

FIG. 6 is an illustration of multi-perspective light field surface cuts for changing stereoscopic disparity; FIG. 6 comprises FIGS. 6(a)-6(d).

FIG. 8 illustrates the effects of disocclusions and occlusions with respect to goal disparities; FIG. 8 comprises FIGS. 8(a) and 8(b).

FIG. 9 illustrates examples of stereo pair with large baseline, stereo pair with small baseline, and nonlinear disparity remapping; FIG. 9 comprises FIGS. 9(a)-9(h).

FIG. 10 illustrates examples of gradient-based disparity remapping; FIG. 10 comprises FIGS. 10(a)-10(c).

FIG. 11 comprises FIGS. 11(a)-11(e).

FIG. 12 comprises FIGS. 12(a) and 12(b).

FIG. 13 comprises FIGS. 13(a)-13(c).

FIG. 14 comprises FIGS. 14(a)-14(b).

DETAILED DESCRIPTION OF EXEMPLARY EMBODIMENTS

Figure 1:
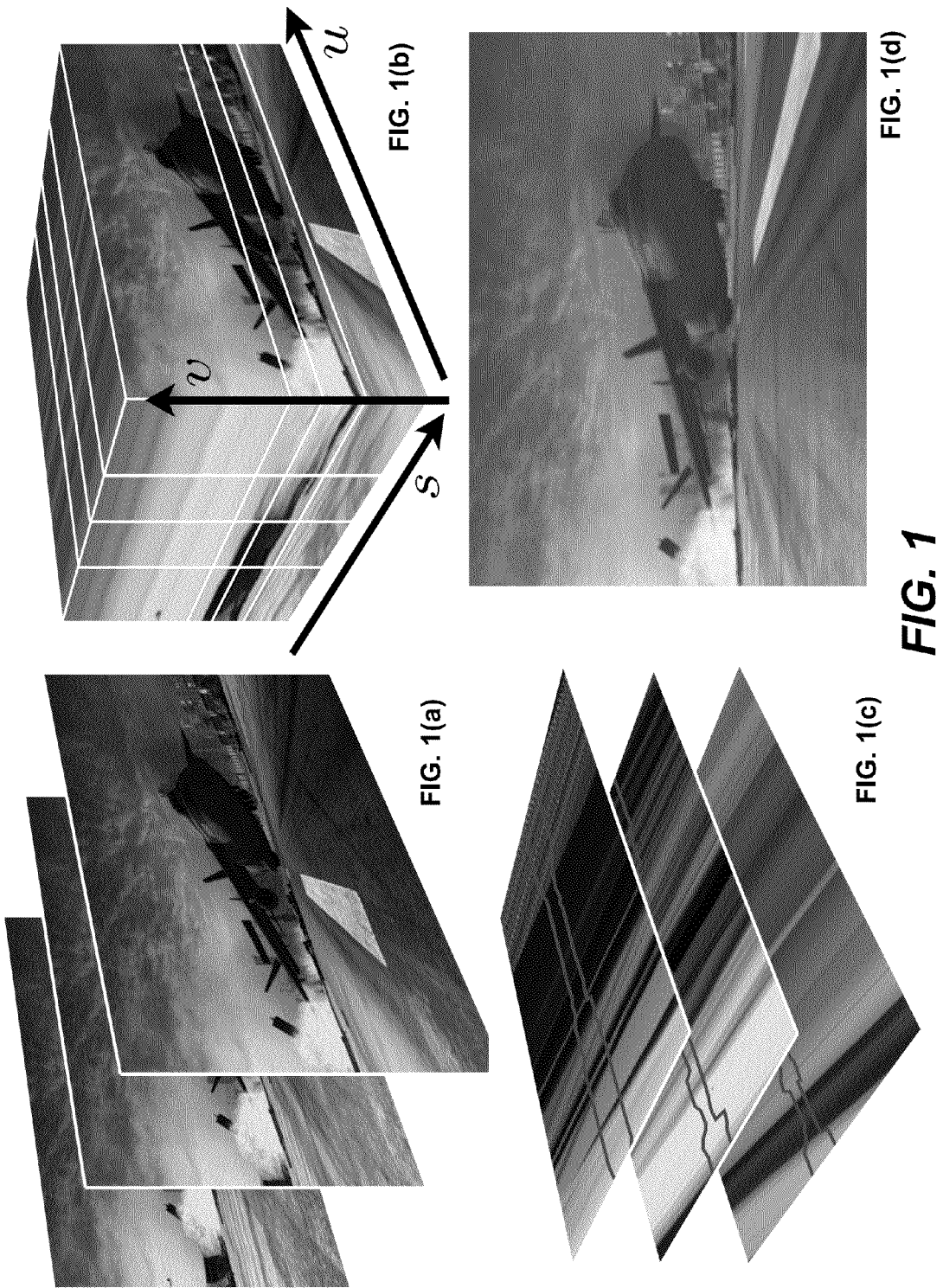
FIG. 1 illustrates an operation of a system for generating multi-perspective stereoscopic output images from a 3D light field.

Methods and systems for generating stereoscopic view from a light field are described herein. Such stereoscopic image generation is useful, as part of graphics rendering, for creating convincing yet perceptually pleasing stereoscopic content using novel stereoscopic processing and post-processing techniques. The generated stereoscopic content using these novel techniques can be particularly useful in context of multi-view autostereoscopic displays.

Many of embodiments described herein allow for generating image pairs for stereoscopic viewing with accurate control over binocular disparity, such as range and gradient, based on multi-perspective imaging from a light field, which is an improvement over prior approaches. The accurate control over binocular disparity allows for per-pixel control of binocular disparity of the generated stereoscopic content. For example, the binocular disparity for each neighboring pixel can be aligned based on a predefined range, in accordance with some embodiments. The per-pixel control over binocular disparity provides flexible and efficient stereoscopic post-processing, such as rendering excessive disparity while preserving while preserving the depth perception.

Lack of proper stereoscopic tools, particularly post-processing tools, has led to usage of tradition monoscopic tools and workflows for stereo-specific tasks [Mendiburu 2009], which are not well-suited for stereoscopic domain. As the result, a variety of prototypes have been developed for light field acquisition [Adelson and Wang 1992; Yang et al. 2002; Ng et al. 2005; Wilburn et al. 2005; Georgiev et al 2006; Veeraraghavan et al. 2007], which enable post-acquisition content modification such as depth-of-field ("DOP"), focus, or viewpoint changes. Although some of these developed prototypes offer post-acquisition content modification, the concept of post-acquisition control and editing is missing in stereoscopic processing. The methods and systems described herein can be used in the context of post-processing pipeline for stereoscopic content creation and editing.

Image Generation from a Light Field

As described above, binocular disparity is one of the most important visual cues that human vision uses to determine the depth perception. The binocular disparity is defined as the difference in location of an object in a scene, due to the eyes' horizontal separation, as seen by each left and right eye. As the result, the generated stereoscopic images of a scene have to only feature horizontal parallax, to simulate the eye's horizontal separation, without any vertical displacement of scene points between the generated stereoscopic images.

[Seitz 2001] showed that in order to only provide horizontal parallax, the generated stereoscopic images have to be constructed from a very specific three-parameter family of light rays. This allows for processing and generating stereoscopic images from a 3D light field instead of four-dimensional ("4D") of higher dimensions as described by [Adelson and Bergen 1991; Levoy and Hanrahan 1996; Gortler et al. 1996].

In some embodiments, a light field may include images from multiple perspectives. For example, multiple images may be captured by a camera as it moves, e.g., along a linear path. The camera may be an actual camera or a virtual camera, i.e., the light field may be generated from recorded or rendered images. The multiple images may be combined into a light field. "Input images" may refer to the multiple images of the light field (e.g, as captured by the camera). Because the light field captures a scene from multiple viewpoints, the light field inherently encodes 3D image.

FIG. 1 illustrates an operation of a system for generating multi-perspective stereoscopic content from a light field. FIG. 1 comprises FIGS. 1(a)-1(d). FIG. 1(a) shows multiple standard perspective RGB images that are used to create a 3D light field. FIG. 1(b) depicts a 3D light field that is created from the set of standard perspective RGB images. FIG. 1(c) illustrates multi-perspective surface cuts from the 3D light field in order to generate stereoscopic content from the light field. FIG. 1(d) illustrated an example stereoscopic content output generated as the result of the multi-perspective cuts, where the generated stereoscopic content shows an emphasis on the depth of local objects of a scene while suppressing the depth perception in the rest of the scene.

In some embodiments, each light ray of the 3D light field L: $R^3 \rightarrow R^3$ is parameterized by three parameters, $L(u, v, s)$. Specifically, parameter s may correspond to the one-dimensional ("1D") positional degree of freedom of the ray origin, whereas parameters (u, v) represent the ray direction. For example, FIG. 1 shows an actual 3D light field in the form of an epipolar plane image ("EPI") volume, as described in [Gortler et al. 1996], which can be intuitively interpreted as a stack of 2D input images. Since the capture process naturally results in a discrete set of rays, each of the parameters u, v, and s may be implicitly treated as integers. Therefore, s may correspond to an index to one of the input images, while (u, v) indexes a pixel in image $I_s$, i.e., $L(u, v, s) = I_s(u, v)$.

Figure 2:
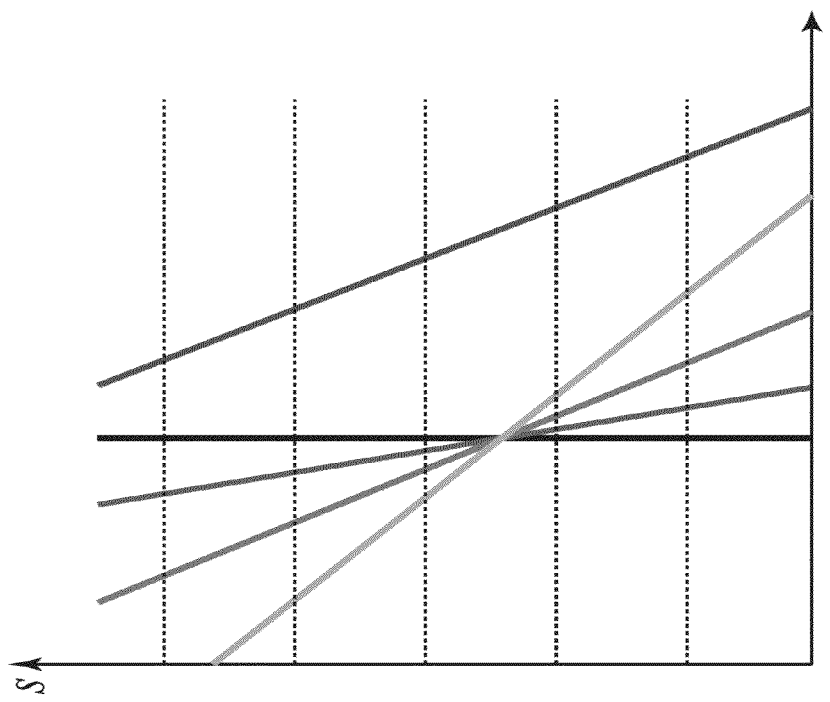
FIG. 2 is a simple example that illustrates a light field parameterization.
Figure 2:
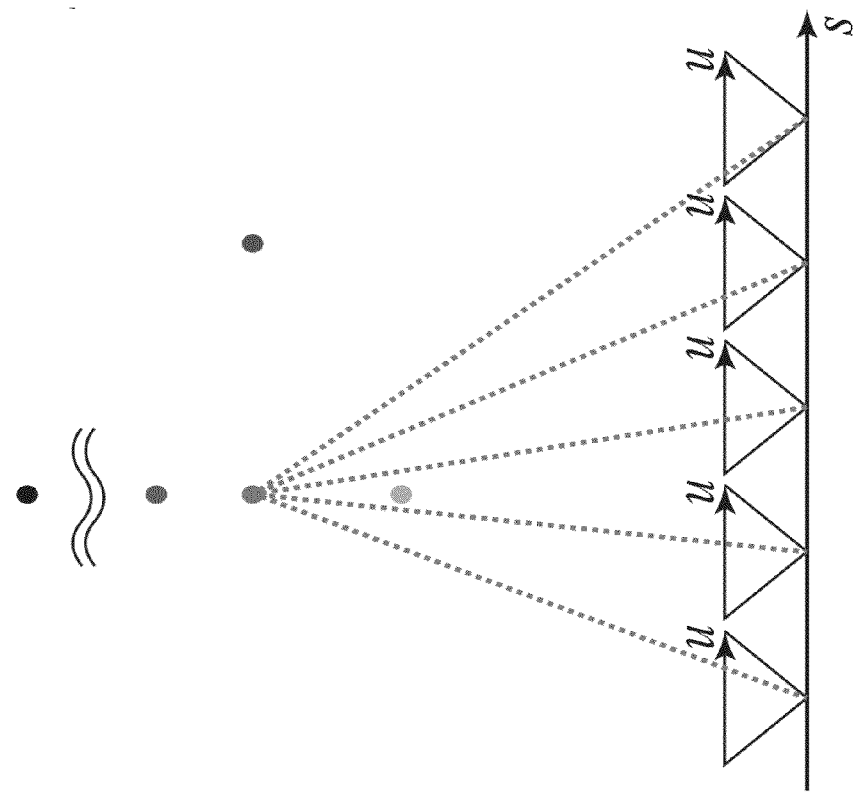

The parameterization of the light field is illustrated in FIG. 2 with a simple example. FIG. 2 comprises FIGS. 2(a) and 2(b). FIG. 2(a) depicts a 2D image of a scene and the corresponding imaging setup to generate a light field. Assuming a uniform sampling of the ray space with respect to these parameters, FIG. 2(b) illustrates a 2D light field corresponding or EPI to FIG. 2(a), where each point in ray space corresponds to a ray in the light field. Scene points seen in multiple images become EPI lines in ray space (see FIG. 1 or 3). The slope of each EPI line is proportional to the distance of the corresponding scene point. As illustrated in FIG. 2, a vertical EPI line may be vertical for the black point at infinity.

Stereoscopic Light Field Surface Cuts

According to some embodiments, a 2D standard (single) perspective or multi-perspective view can be generated by selecting a 2D subset of rays of the light field, L. As illustrated in FIG. 3(a), a planar u-v-slice or 2D cut at a particular parameter position s extracts the original input image, $I_s$, with standard perspective. Surface cuts made by varying parameter s can yield images with varying centers of projection, in accordance with some embodiments. A planar v-s-cut with constant parameter u results in a so-called "pushbroom" panorama, which corresponds to a sensor with a single pixel column and a linearly varying position of the camera center [Yu et al. 2010]. As further illustrated in FIG. 3, a u-s-cut represents a single EPI, i.e., a 2D stack of the same scan line across all input images.

Any 2D subset of rays, other than planar cuts, with a certain ray coherence can be used to generate "meaningful" images. As described by [Seitz 2001] and [Peleg et al. 2001], multi-perspective images that feature only horizontal parallax can be fused stereoscopically. This would allow for generation of multi-perspective stereoscopic image pairs with controlled disparity by computing corresponding surface cuts through a light field. For example, FIG. 1(c) illustrates piecewise continuous surface cuts through an EPI volume shown in red that may be generated, which enable per-pixel disparity control.

Figure 4:
FIG. 4 illustrates an example 2D EPI of a light field with two planar u-t-cuts and the corresponding stereoscopic image pair generated from $I_s$ and $I_{s'}$.

In order to produce an output image from a light field, light rays lying on the cut surface may be sampled through parameterization of a cut through the light field. In some embodiments, multiple simultaneous surface cuts of the light field may be sampled through parameterization for stereoscopic image generation. As illustrated in FIG. 2(a), different parameters s represent input images captured at different, linearly translated camera positions. Correspondingly, the difference $A(s', s)=s'-s$ is proportional to the camera baseline between two images $I_{s'}$ and $I_s$, i.e., $b=\Delta(s', s)/\gamma$, where $\gamma$ depends on the distance between the cameras, the field-of-view, and the horizontal image resolution. Hence, a stereoscopic image pair with baseline b can be generated by picking a reference view $I_s$ and selecting the second view at $s'=s+\gamma b$ corresponding to two parallel u-v-cuts through L. The convergence for such a stereoscopic image pair can be modified by shifting $I_s$ horizontally with respect to $I_{s'}$, as illustrated in FIG. 4.

In some embodiments, a 3D disparity volume D: $R^3 \rightarrow R^+$ is defined to provide maximum control of the perceived depth when viewing a stereo image pair generated from L. As shown in FIG. 5(a), the 3D disparity volume stores the scaled reciprocal of the distance to the corresponding scene point for each ray in L. The 3D disparity volume may be created from standard depth or disparity maps and can be interpreted as a normalized disparity, such that the actual image disparity for a pixel p in $I_{s'}$ to a reference image $I_s$ can be formulated as shown in Equation 1, where p is a shorthand notation for the coordinate pair (u, v).

$$T_s(p,s')=\Delta(s',s)D(p,s') \quad \text{(Eqn. 1)}$$

An example of the actual image disparity for a pixel p in $I_{s'}$, to a reference image $I_s$, i.e. the true disparity volume $T_s$ for a particular view $I_s$ is illustrated in FIG. 5b.

Goal-Based Multi-Perspective Cuts

Having a reference view L and the true disparities $T_s$, a second view $I_{s'}$ such that $T_s(*, *, s')$ may be found that does not exceed a certain disparity range. In some embodiments, the distance $A(s', s)$ between the cuts, for example $I_s$ and $I_{s'}$, may be adjusted to ensure the proper disparity range. In some other embodiments, the proper disparity range may be adjusted for only a particular point of a scene rather than changing the depth impression of the whole scene through determining non-planar and multi-perspective views that satisfy more general, content-dependent disparity constraints.

FIG. 6(a) shows a normalized disparity volume d and two images $I_s$ and $I_{s'}$. According to some embodiments, the horizontal parallax or image space disparity d of a pixel in $I_s$ to the corresponding pixel in $I_{s'}$ can be computed as $T_s(p', s')=\Delta(s, s')D(p, s)$. FIG. 6(b) illustrates a modified stereo pair that features a different depth impression only for the particular scene point seen at $I_s(p)$ by keeping s and s' fixed and updating the actual scene depth, D(p, s). The actual scene depth may by updated through deformation of the actual geometry of the scene, which modifies the disparity d to d' and changes the slope of the corresponding lines in the EPI volume. However, updating the depth of a scene implies changes to the complete underlying light field since changing the depth of a scene point changes the slope of the corresponding line in a ray space. As can be seen in FIG. 6(c), changing depth of the orange region results in different disocclusion patterns, with missing information in the light field depicted as red and blue regions. Since the corresponding light rays for these regions have not been captured in the original light field, completing these regions would require complex resampling and hole-filling operations on the light field.

According to certain embodiments, a non-planar surface cut $s_C: R^2 \rightarrow R$ through the light field is determined, as illustrated in FIG. 6(d), which maps rays p to parameters s in order to meet a certain set of goal disparity constraints. The corresponding multi-perspective image $I_{s_C}$ generated from the non-planar cut $s_C$ effectively results in the same change of disparity from d to d' as other approaches previously described without deforming the actual geometry of the scene. A second view satisfying the disparity constraint for pixel p with respect to reference image $I_s$ can be generated from a cut $s_C$ that intersects the EPI line corresponding to $I_s(p)$ at parameter position u+d'. The cut $s_C$, corresponding to the second view, selects a pixel from some input image for each pixel $I_s(p)$ such that the desired disparity constraints are fulfilled. As the result, the cut $s_C$ produces a multi-perspective output image $I_C$ that, together with the reference view $I_s$, forms a stereoscopic image pair effectively controlling the camera baseline per-pixel.

A 2D map, G: $R^2 \rightarrow R$, is defined as a set of goal disparities that, for each pixel of the output view $I_C$, defines the desired disparity with respect to the reference view $I_s$ as follows. For example, if the disparity of pixel u in $I_s$ to the multi-perspective image $I_C$ should be changed to d', the value of the goal disparity map at position u+d' has to be set to G(u+d', v)=d'. In order to create a corresponding stereoscopic image pair, the goal disparity map has to be defined as shown by Equation 2, which can be constructed by iterating over all pixels u in the reference image Is.

$$G(u+\phi(D(u,v,s)),v)=\phi(D(u,v,s)) \quad \text{(Eqn. 2)}$$

In Equation 2, $\phi: R \rightarrow R$ may be a disparity mapping function that defines how the normalized disparity D may be mapped to a new disparity range.

Figure 7:
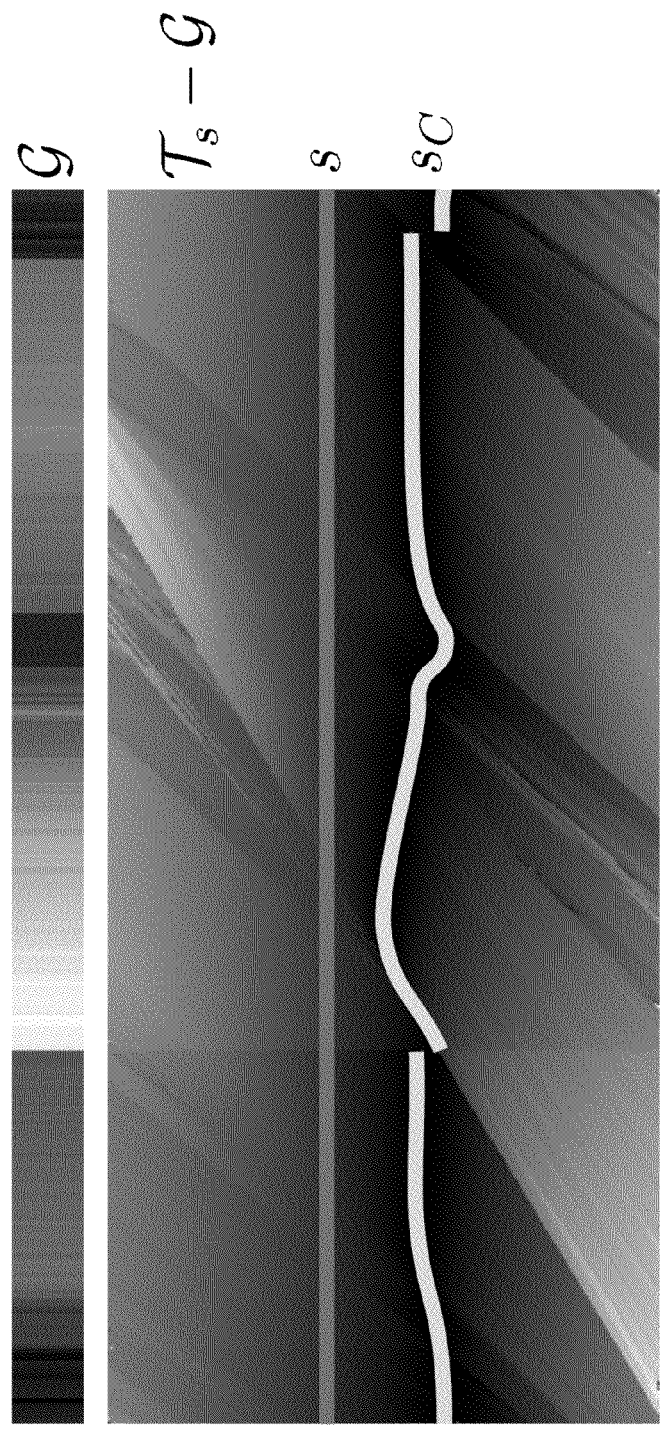
FIG. 7 illustrates an example 1D slice of a 2D goal disparity map G and the corresponding difference volume of $T_s$–G illustrated as an unsigned function.

Considering that the true disparity volume $T_s(u, v, s')$ represents the actual disparity of a point (u, v, s') with respect to $I_s$, the difference volume $T_s(u, v, s')-G(u, v)$ then represents the deviation of a pixel's disparity from the desired goal disparity. In some embodiments, this deviation representation is used to determine a cut $s_C$ that passes close to the zero set of this difference volume in order to satisfy the disparity goal for each point of the scene. For example, a difference volume $T_s(u, v, s')-G(u, v)$ and a vertically stretched 1D slice of the 2D goal disparity map G are illustrated in FIG. 7. As can be seen, the difference volume $T_s-G$ is shown as an unsigned function, which represent deviation of each point in the light field from the desired disparity. The cut, $s_C$, can be determined such that it passes close to the zero set of the difference volume. This would lead to generation of the resulting image $I_C$ and $I_s$ that may form a multi-perspective stereoscopic image pair with the desired goal disparity.

The construction of G is neither surjective nor injective due to occlusions and disocclusions in the scene. In other words, disparity constraints cannot define for regions that are occluded in $I_s$ but most likely disoccluded in an output view $I_C$. Since a reference image $I_s$ contains depth information for scene elements visible in $I_s$, the construction of G by forward mapping of remapped disparities $\phi (D(*, *, s))$ for G construction is not surjective, which leads to undefined segments in G, such as left blue segment as shown in FIG. 8. In order to show an undistorted standard perspective view of all undefined disoccluded regions, a certain smoothness may be imposed on the cut sc, as the undefined regions generally only cover a small number of pixels, in accordance to some embodiments. Similarly, the construction of G is not infective due to visible regions in $I_s$ that may be occluded in other views. Since differently remapped disparities of close and distant objects that may compete for the same slot in G, such as overlapping orange and pink region as shown in FIG. 8(b), the disparity constraints for the closer object may be selected and stored.

Disparity Remapping

Linear remapping of the disparity range corresponds to changing the camera baseline between two standard perspective views. As shown in FIG. 9(b), two cuts are selected closer than the cuts shown in FIG. 9(a) in order to produce a decreasing baseline. This way, the quite abstract and unintuitive concept of the camera baseline is eliminated, and one can directly specify the desired goal disparity range of the output images as the image disparities resulting from a particular camera baseline are dependent on the scene content.

When nonlinear changes of the disparity space are required, arbitrary remapping functions $\phi$ can be applied to construct the desired goal disparity volume and even constant disparities are possible. For example, $\phi$ could be any of the nonlinear disparity mapping operators introduced by [Lang et al. 2010] for display adaptation, stereoscopic error correction, or artistic effects. These functions can act globally on the complete domain as well as locally by remapping disparity gradients.

FIG. 9(a) shows a standard stereo pair with a large baseline where the foreground provides a good impression of depth. Typically, the large baseline causes quite large disparities in the background region of the image that can lead to ghosting artifacts or even the inability to stereoscopic fuse, when viewed on a larger screen. Although decreasing the baseline (i.e. reducing the distance of cuts) would reduce the ghosting problems with respect to the background, as shown in FIG. 9(b), but also considerably flattens the foreground of the scene. In such cases, nonlinear disparity mapping function can enhance the depth impression of the foreground, while keeping the maximum disparities in the background bounded as shown in FIG. 9(c). As illustrated by the histograms and graphs of FIG. 9(d)-(h), the depth between the foreground and the background is preserved using the non-linear disparity remapping while the depth is lost in case of linear disparity remapping.

In some embodiments, the final goal disparity may be set using the gradient based remapping. For gradient based remapping, gradients in x and y directions are computed and processed non-uniformly using the gradient magnitudes, for example to suppress big disparity jumps. Then, the height field is reconstructed by integration of the gradients using a Poisson Solver. As shown in by examples of FIG. 10, non-linear disparity gradient remapping may reduce the overall disparity range while preserving the perception of depth discontinuities and local depth variations. The top portion of each FIG. 10(a)-(c) shows the stereo image pair with two perspective images and a fixed baseline while the bottom portion of each FIG. 10(a)-(c) depicts the end result after non-linear disparity remapping. As expected, elements closer to camera (e.g. car or plane) would keep the depth perception while the background ghosting effect has been reduced.

Figure 11:
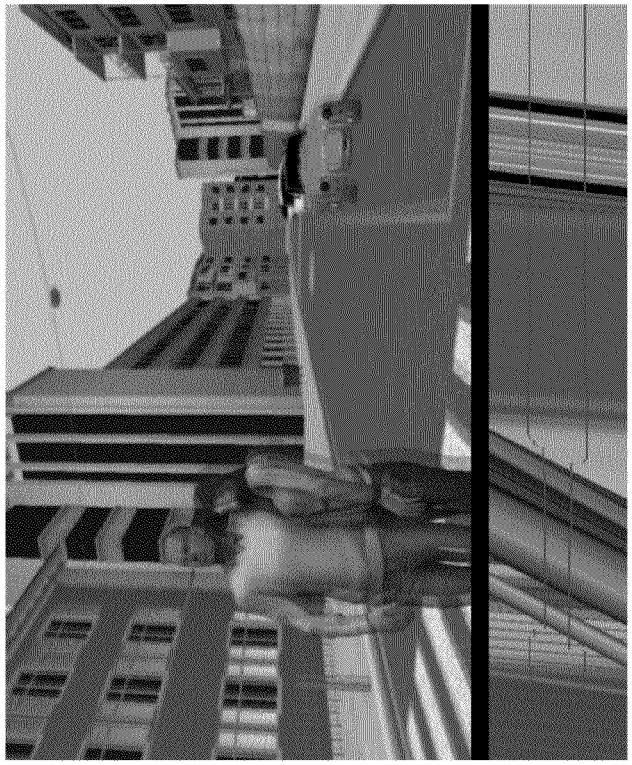
FIG. 11 illustrates an example gradient domain compression.
Figure 11:
Figure 11:
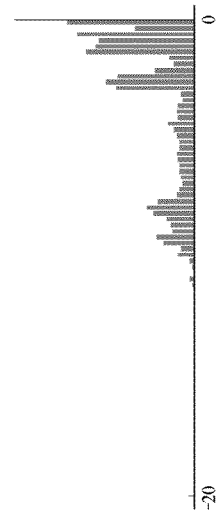
Figure 11:
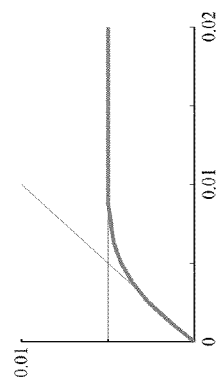
Figure 11:

In some embodiments, scene elements with strong negative disparity may be compressed using the gradient remapping function. For example as shown in FIG. 11, the partially cropped couple feature strong negative disparity, which results in a window violation, as described by [Mendiburu 2009]. Since changing the convergence would increase the background disparities, the scene elements with strong negative disparity may be compressed in order to resolve the disparity problem. This way, the scene element with strong negative disparity would be pushed closer to the screen while keeping the background disparities unchanged. By comparing the histograms of the FIG. 11, it is evident that the background and foreground disparities are compressed after gradient domain remapping.

Figure 12:
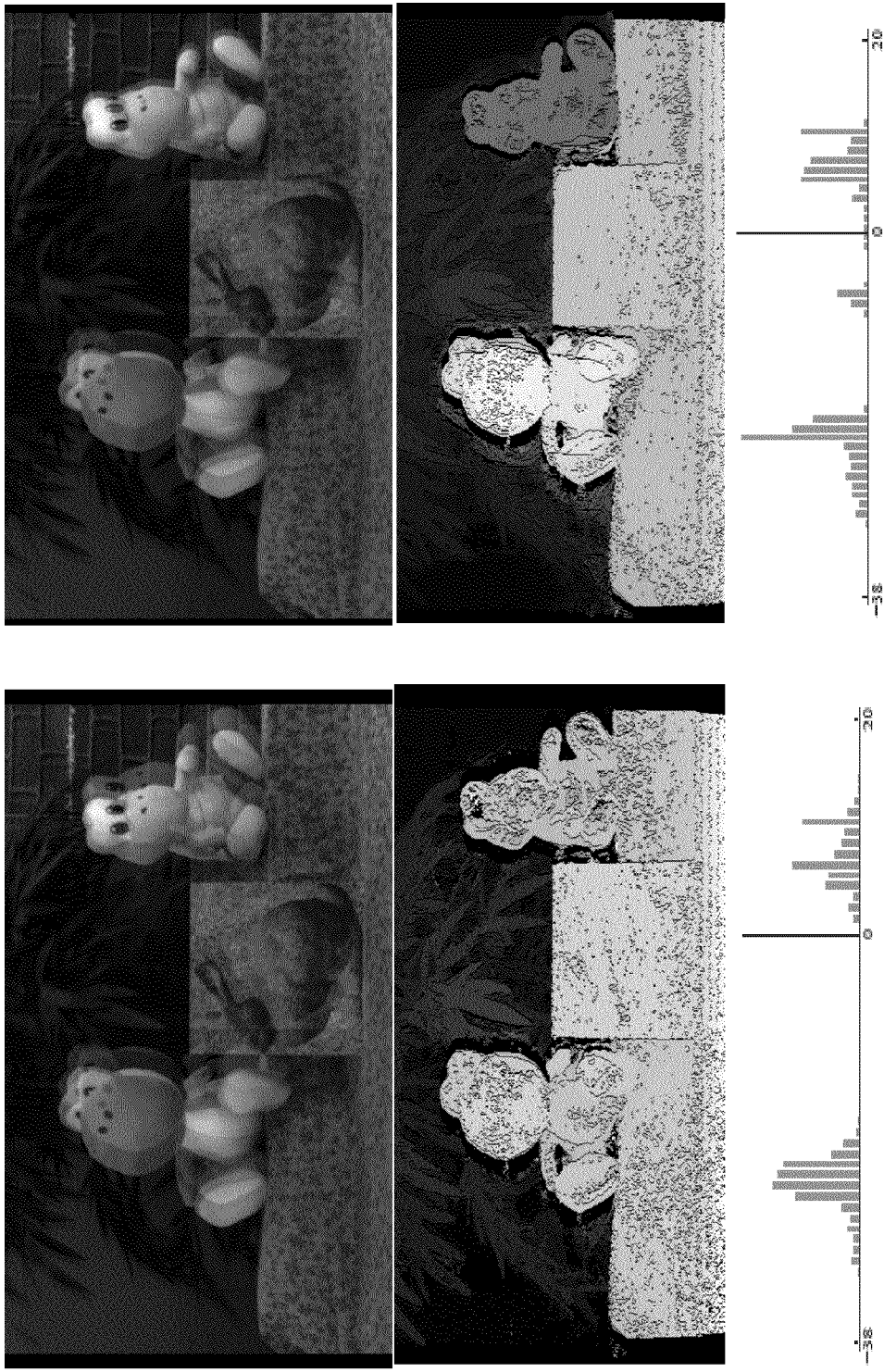
FIG. 12 illustrates an example of artistic control over disparity constraints.

In some embodiments, a concise manual control of disparities is provided, which is an important requirement in any stereoscopic production environment. An artist may construct a desired goal disparity map by modifying the depth map of the reference view using existing 2D segmentation and brush tools, which allows for interesting artistic effects as well as fine-scale correction of the stereoscopic impression of a scene. FIG. 12 shows examples of manual control over disparity. In some other embodiments, an artist may manually "mask out" certain undesirable regions of a light field, e.g., for removing certain visually distracting effects from a stereo pair, such as monocular specular reflections. For example, FIG. 12(b) illustrates disparity map and histogram for a resulting stereo pair after an artist's modifications. As used herein, it should be understood that "artist" refers to a user who is generating an image and may encompass someone just creating an image for their own use, a professional creating images for some sort of image production, or other types of users that desire to create images.

Formulation as an Energy Minimization Problem

A wide variety of problems may be solved in terms of energy minimization problem. Such problems may be formulated as an energy minimization problem, where the solution typically corresponds to a maximum posteriori estimate of a solution. The value of the formulated function represents the energy of a system that is being modeled. Accordingly, the problem of determining the proper cut $s_C$ may be formulated as an energy minimization problem. The energy measuring the deviation of a 2D cut $s_C$ may be expressed as shown in Equation 3.

$$E_d(s_C) = \sum_p |T_s(p, s_C(p)) - G(p)|. \tag{Eqn. 3}$$

Although a cut $s_C$ computed from this data term closely follows the prescribed goal disparities, it does not enforce any coherence between neighboring output rays or output pixels. The lack of coherence between output image points may cause visual artifacts in noisy or ambiguous estimates of $T_s$. Such artifacts are particularly noticeable in highly textured regions or at depth discontinuities. Therefore, an additional content-adaptive smoothness term may be introduced to the formulated energy minimization problem, in accordance to some embodiments.

The smoothness constraint may be applied differently to each region of an image. In some embodiments, a higher smoothness is enforced to increase the coherence of the rays selected by $s_C$ in the proximity of visually salient parts of an image, such as depth discontinuities and highly textured regions. In particular, a higher saliency may be assigned to scene elements close to the camera and cut through more distant regions. Conversely, the smoothness constraint may be more relaxed in order to increase the flexibility of the cut to perform multi-perspective view transitions in the light field. The energy formulation reflecting the described properties may be expressed as shown in Equation 4, subject to the equalities of Equations 5 and 6, where $N_u$ and $N_v$ are the sets of all neighboring pixels along the u-axis and v-axis, respectively.

$$E_s(s_C) = \sum_{(p,q)\in N_u} |s_C(p) - s_C(q)| p_u(*) + \sum_{(p,q)\in N_u} |s_C(p) - s_C(q)| p_v(*) \quad \text{(Eqn. 4)}$$

$$p_u(*) = \min(p_{max}, |\partial_s D(*)| + \lambda D(*) + \kappa |\partial_s L(*)|) \quad \text{(Eqn. 5)}$$

$$p_v(*) = \min(p_{max}, |\partial_s D(*)| + \lambda D(*) + \kappa |\partial_u L(*)|) \quad \text{(Eqn. 6)}$$

In Equations 4, 5 and 6, (*) stands for (p, $s_C$(p)). The term $s_C$(p)−$s_C$(q)|penalizes variation of the cut $s_C$ along the s-axis, i.e., view transitions. This penalty is weighted by the content-adaptive terms $p_u$(*) and $p_v$(*), respectively.

For both axes, the weighting depends on depth discontinuities as $\partial sD$ and the absolute normalized disparity D. Depending on the sampling of the light field, noticeable disparity jumps may be introduced by view transitions to an adjacent view for scene elements very close to the viewer. In some embodiments, increasing smoothness for those regions and over depth discontinuities effectively moves view transitions to less noticeable regions in the background. In some other embodiments, the smoothness for other regions of the image with different saliency may also be increased in order to encourage view transitions in less salient regions.

The smoothness of the cut $s_C$ may be controlled effectively using the depth-based terms introduced in equation 4. For example, change of radiance between different input images $I_s$ may be taken into account for the u-axis, while jumps of the cut in the proximity of vertical image edges of v-axis may be penalized. In some embodiment, similar to the concept of robust nonlinear error functions, the maximum penalty pmax ensures that the cut $s_C$ can be discontinuous when required by the defined goal disparity.

According to some embodiments, constants are introduced in equation 4 to bring all terms to a similar scale. For example, defining λ=0.05, κ=0.1, and pmax=0.3 would cause the final energy to be defined as shown in Equation 7, where k=250.

$$E(s_C) = E_d(s_C) + kE_s(s_C) \quad \text{(Eqn. 7)}$$

According to some embodiments, increasing the smoothness constraint through increasing the value of k may produce "flattened" cuts, i.e. output images closer to a standard perspective image. Such increase simply makes the output image to simply fall back to the original input images without compromising the image quality.

Optimization Via Graph Min-Cuts

The energy minimization problem as described by Equation 7 may be solved using the graph cut optimization using, for example, standard procedure for binary s-t cuts. The graph used for optimization may comprise a set of nodes that correspond to pixels or some other feature and a set of edges connection the nodes. Such graph may also include some additional special nodes of the graph called terminals corresponding to a set of labels that can be assigned to pixels. The terminals are typically called the source s and the sink t. An s-t cut on a graph with two terminals would lead to partitioning of the nodes of the graph into two disjoint subsets of S and T, respectively containing the source s and the sink t.

According to some embodiments, employing the standard procedure for binary s-t cuts as follows:

1. For n input images of dimension w×h, construct a 3D regular graph of size w×h×(n+1).
2. Associate a ray at position (u, v, s') with a directional graph edge between the corresponding two nodes along the s-axis, and choose the edge weight as |$T_s$(u, v, s')−G(u, v)|.
3. Weight bi-directional edges between neighboring nodes along the w axis and v-axis with the corresponding smoothness values k$p_u$ and k$p_v$ respectively.
4. Connect boundary nodes corresponding to parameters s=0 and s=n to the source and sink of the graph, respectively, with infinite weights.

As the result, the minimum s-t cut of this graph may yield the desired cut surface $s_C$ that minimizes Eq. (5). In some embodiments, the cut $s_C$ may be determined by a modification of the s-t cut algorithm and/or energy minimization formulation. For example, additional penalty edges for enforcing the cut)($C^0$) continuity may be used as described by [Rubinstein et al. 2008]. As another example, piecewise continuous cuts may be used to provide more flexibility due to the support for sudden view transitions.

According to some other embodiments, different methods for solving the formulated minimization energy problem may be used, such as an alternative formulation may be used on multi-labeling via α-expansion, where each label is associated with a particular u-v-slice along the s-axis of the EPI volume.

Extensions and Applications

Above, details have been described for a basic methods and systems for generating stereoscopic view from the light field, which includes formulation of energy minimization problem and optimizing it via graph min-cuts. These embodiments are useful in many situations as-is. However, stereoscopic image generation from a light field often has unique, specialized requirements, and the disclosed embodiments might not cater to all situations. However, the additional features described herein can provide a variety of embodiments that may satisfy the needs of some particular situations.

N-View Stereo from Multiple Cuts

In some embodiments, two or more multi-perspective cuts may be created instead of creating a stereo pair consisting of a standard perspective image $I_s$ and a multi-perspective image $I_C$. For example, where the goal disparities are evenly distributed to both views and the reference view is centered between the two multi-perspective output cuts, two goal disparity maps $G_L$ and $G_R$ may be defined and expressed as equations 8 and 9.

$$G_L(u - \tfrac{1}{2}\phi(D(u,v,s)), v) = -\tfrac{1}{2}\phi(D(u,v,s)) \quad \text{(Eqn. 8)}$$

$$G_R(u + \tfrac{1}{2}\phi(D(u,v,s)), v) = +\tfrac{1}{2}\phi(D(u,v,s)) \quad \text{(Eqn. 9)}$$

It should be understood that more than two views may be created and handled in an identical manner.

While separately defining a goal disparity map for each view provides high flexibility, many application scenarios, such as multi-view autostereoscopic displays, often require simply a linear change of disparity between views. This can be exploited for an efficient interpolation based algorithm to generate multiple views with just the reference view s and one multi-perspective cut $s_C$. For example, $s_C$ may be determined using a mapping function $\phi$(D(u, v, s)) while the two views s and $s_C$ may be converted into n views with linearly interpolated disparities. Using Equation 2, a computer process operate knowing that the goal disparities of view k∈[0, n] may be expressed as in Equation 10.

$$G\left(u + \frac{k}{n}\phi(D(u, v, s)), v\right) = \frac{k}{n}\phi(D(u, v, s)) \quad \text{(Eqn. 10)}$$

In this example, a cut $s_C^k$ may contain the interpolated points of all EPI lines connecting corresponding points of s and $s_C$.

Multi-View Autostereoscopic Displays

Figure 13:
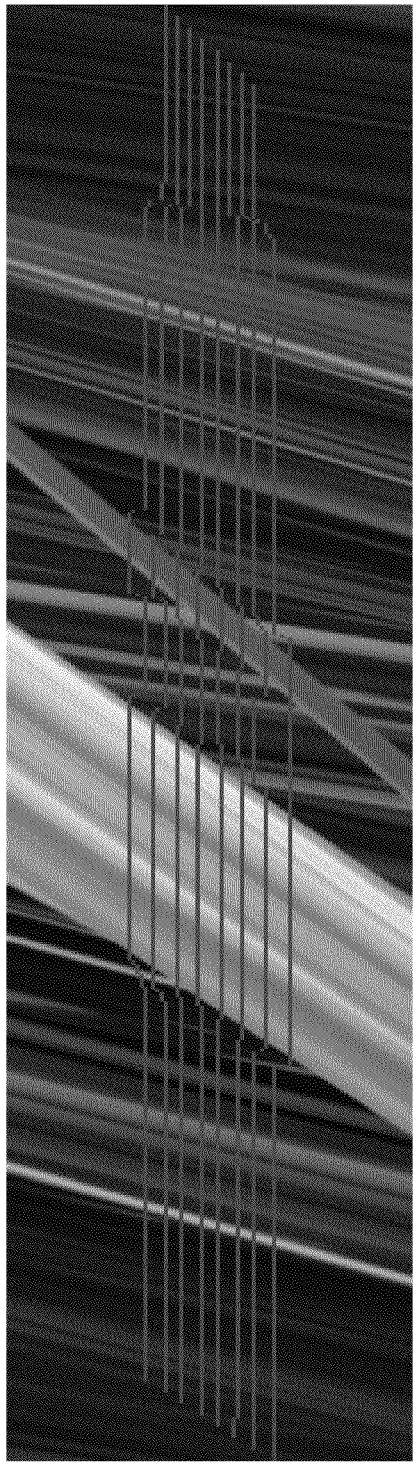
FIG. 13 illustrates multiple views (i.e. slices of the light field), along with examples of optimized and unoptimized stereo images for multi-view autostereoscopic displays.
Figure 13:

A particularly useful application is to compute image sets for multi-view autostereoscopic displays, which generally support only a very restricted disparity range without leading to excessive ghosting artifacts. Similar to stereoscopic displays, the multi-view autostereoscopic displays have a limited depth budget. In order to avoid inter-perspective aliasing, an input light field may be pre-filtered and remapped to the available spatio-angular display bandwidth as described by [Zwicker et al. 2006] to optimized the output image displayed. Properly remapped data may be obtained to drive a particular automultiscopic display by determining multiple surface cuts through a light field volume in order to create n-view stereoscopic datasets. For example, an 8-view autostereoscopic display from Alioscopy is illustrated in FIG. 13.

FIG. 13(a) illustrates multi-perspective 8-view stereo that is depth-enhanced and optimized with respect to the disparity requirements of an actual multi-view autostereoscopic display. FIG. 13(b) shows an unoptimized content with considerable ghosting artifact. In contrast, FIG. 13(c) illustrates an optimized n-view stereo images that are designed to meet the disparity requirements of the output device while enhancing perceived depth our method can automatically compute.

Stereoscopic Video Processing

It is generally desirable to enforce a certain continuity between two cuts at consecutive time steps in order to process video. Currently, a temporal dimension is added to the graph structure to enforce temporal smoothness. Each time step has its own 3D subgraph, and corresponding nodes of subgraphs from consecutive time steps are connected via an additional edge. However, this leads to processing the whole 4D spatio-temporal light field volume at once.

In some embodiments, the concept of decaying influence of previous time steps on the data and smoothness terms of the current time step is introduced to avoid processing the whole 4D spatio-temporal light field volume at once. For example, $e_t$ may denote the edge weight for a given time step t according to Equation (3) and Equation (4). During the update of the graph structure from time t−1 to t, for any edge, the temporally averaged edge weight may be set as shown by Equation 11. In some embodiments, $\alpha=0.9$ may be used since the temporal evolution of a light field is quite coherent.

$$e_t'=\alpha e_t+(1+\alpha)e_{t-1} \qquad \text{(Eqn. 11)}$$

Deferred Rendering for Computer-Generated Content

Another particular useful application is in computer-generated content processing, such as 3D animation movies. Implementing multi-perspective camera models into the computer-generated rendering pipeline to meet the expectations of a director regarding control and flexibility is often a difficult problem. Also, changing (e.g. warping) the 3D geometry does not allow for arbitrary complex disparity constraints without compromising the scene composition, lighting calculations, or visual effects.

In some embodiments, deferred rendering method may be used to provide a practical solution for processing the computer-generated content to reduce rendering time for generating a light field for computer-generated content. This way, only the depth maps of the input views may be rendered and used to generate a disparity volume D, which is typically several orders of magnitude faster than rendering fully shaded color images and creating a light field from these images. Once the required set of input views is known from the surface cut $s_C$ of the disparity volume, those fully shaded color images corresponding to the surface cut $s_C$ or just the optimal set of light rays determined from the surface cut $s_C$ can be rendered and combined for computer-generated content processing. In some embodiments, even lower resolution proxy geometry could be used instead of the highly tessellated subdivision surfaces often used in rendering.

Different Light Field Parameterizations

In other application scenarios, it may be preferred to produce other forms of stereoscopic images, such as Omnistereo panoramas as discussed by [Peleg et al. 2001], or stereo Pushbroom panoramas and Cyclographs as discussed by [Seitz 2001]. For these types of images, the light field parameterization, light field cut, and sampling scheme may have to be reconsidered. For example, having a standard perspective reference image or sampling along the u-v-dimension of the light field may not be desirable in all scenarios.

As mentioned above, in our light field representation, a stereoscopic Pushbroom panorama simply corresponds to a v-s-cut instead of a u-v-cut. In other words, stereoscopic Pushbroom images may be created by mere swapping the dimensions u and s in our disclosed formulation. For Omnistereo panoramas and Cyclographs, the 3D light fields are essentially constructed with a rotating camera with a certain offset orthogonal to the rotation axis, yielding a u-v-a volume. In these scenarios, planar v-a slices can be used to produce stereoscopic panoramas.

Required Number of Input Images

The number and spacing of input images needed generally depend on the desired level of control over disparity, which is application dependent. For instance, a typical problem scenario in stereoscopic movie production is that parts of a sequence shot with a standard stereo camera violate certain disparity constraints, such as window violation, maximal disparity, etc. In order to fix such issues, a second view with the remaining scene may be manually composed, so that a few additional views of a scene would be able to resolve certain problems. As an example, as few as 4 input images may be used for the final output view for correcting excessive disparities and stereoscopic window violation. Generally, the number of images used for image generation rarely exceeded 10 images. One of the main reasons for such performance improvement is the normalized disparity volume D, which can in practice often be computed from a much sparser set of depth maps or images. Accordingly, the proposed methods and systems not only perform well with densely sampled light fields, but also scale well and are applicable to scenarios with a considerably smaller number of inputs views.

Variations

In addition to basic systems described herein, more complex systems might be implemented. As described above, per-pixel goal disparity constraints are mainly used to derive the energy minimization problem to determine a surface cut through the light field. In addition to the goal-based cut optimization mainly focused on disparity constraints, there might be more emphasis placed on other constraints, such as stereoscopic perception, visual saliency, or temporal coherence.

In order to provide a better performance, potential resampling issues that might arise may be addressed explicitly. To address the resampling issues, different method and techniques may be used. For example, gradient-based image reconstruction, gradient-domain cuts, sub-pixel resolution techniques, and methods for upsampling of the light field may be used.

Determining a cut through the light field is largely dependent on per-pixel goal disparity constraints. The disparity constraints are defined with respect to a reference image view. In another system variation, disparity constraints may be defined using pairwise constraints between neighboring views for regions occluded in the reference view.

Light Field Domain Computation of a Goal Image

Various embodiments described above use a disparity-domain approach to solve for an output image, i.e., the problem is formulated in disparity space. For example, the embodiments above may use a disparity volume D, including a depth map corresponding to each view (e.g., input image) of a light field, and graph cut optimization may use data from the disparity volume D to produce an output image.

In embodiments described below, an output image ("goal image") can be obtained using a light field domain approach. In this way, the computational expense of generating a disparity volume may be avoided. A stereoscopic pair of images may include the goal image and a reference image provided as an input. In other embodiments, a stereoscopic pair of images may include two goal images determined based on a reference image. The stereoscopic pair of images may be combined into a 3D image.

Figure 14A:
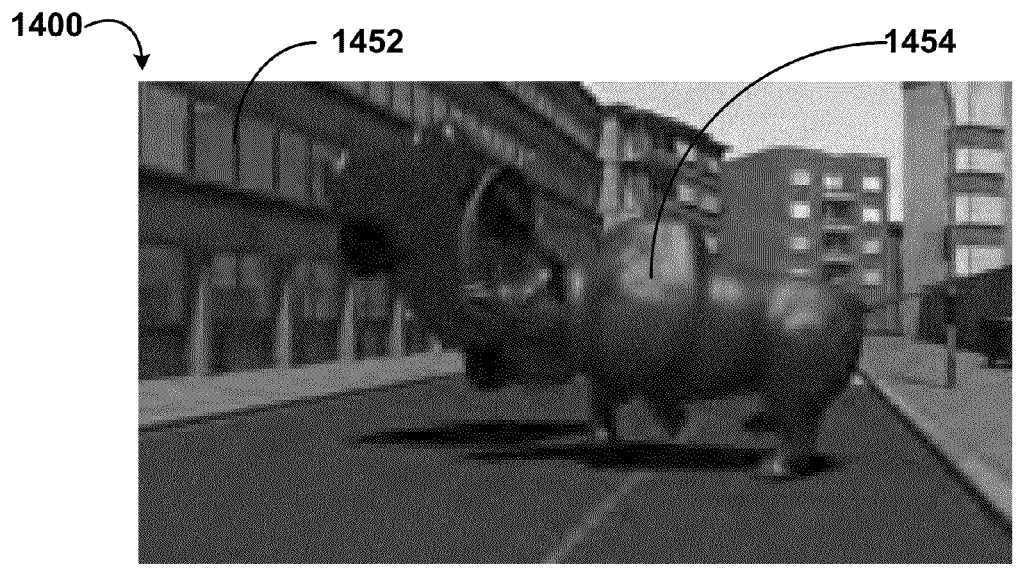
FIG. 14 illustrates a reference image and a corresponding goal disparity G.

FIG. 14(a) illustrates a reference image $I_s$. Reference image $I_s$ (1400) may be an image from which a stereoscopic image will be generated. A stereoscopic pair of images may include the reference image and the output image.

Figure 14B:
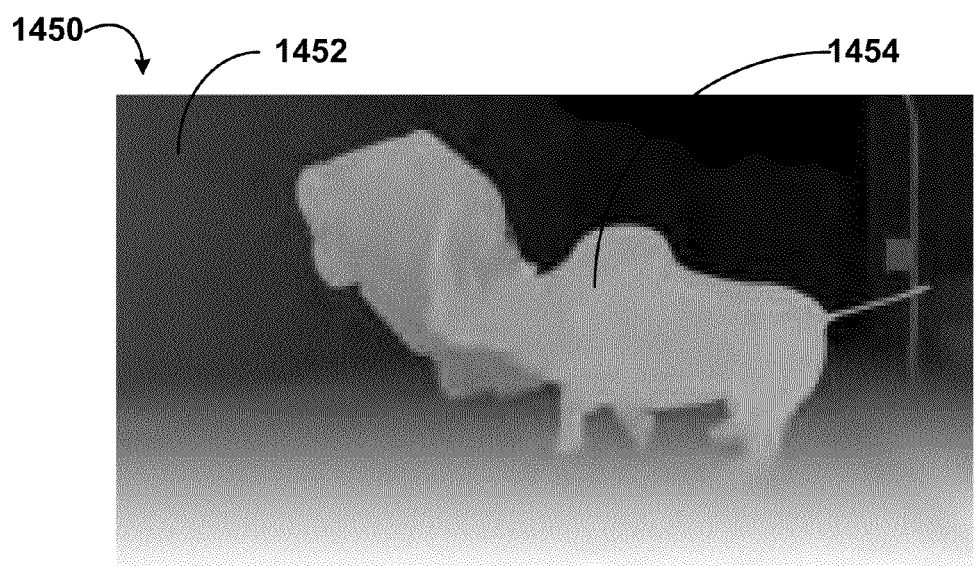

FIG. 14(b) illustrates a goal disparity G. Goal disparity G (1450) may indicate the relative depth at which various portions of reference image $I_s$ are to be shown in a 3D image based on the reference image. In some embodiments, a value of a pixel of goal disparity G may be used to indicate a desired disparity. For example, at 1452, a relatively dark-colored pixel is shown. This may indicate that it is desired for pixel 1402 of reference image 1400 corresponding to pixel 1452 of goal disparity 1450 to be shown in the background (e.g., at a greater depth) in the stereoscopic image generated from reference image 1400. At 1454, a relatively light-colored pixel is shown. This may indicate that it is desired for pixel 1404 of reference image 1400 corresponding to pixel 1454 of goal disparity 1450 to be shown in the foreground (e.g., at a lesser depth) in the stereoscopic image generated from reference image 1400. Goal disparity G and reference image $I_s$ may be received as input to a program for calculating a goal image.

In some embodiments, the disparities of goal disparity G (1450) are determined in response to user input. For example, an artist may select pixels and/or groups of pixels of reference image 1400 and indicate a desired relative depth for the selected portions. The artist may use an application for determining related groups of pixels within an image, associating desired depth values with pixels, and generating goal disparity image 1450. Alternatively, an application may algorithmically determine the depth values for goal disparity image 1450.

Reference image $I_s$ (1400) may be warped by goal disparity G to find the multi-perspective image in the light field that provides the best match for the goal disparity. Each pixel of the goal image may be obtained from a separate input image of the light field that is the best match for the desired depth as indicated in goal disparity G (1450).

Figure 15:
FIG. 15 illustrates a dual reference image.

A dual reference image $I_s^*$ is shown in FIG. 15. Dual reference image $I_s^*$ may show reference image $I_s$ shifted by goal disparity G. $I_s^*$ may be defined as indicated in Equation 12.

$$I_s^*(u+G(u,v),v)=I_s(u,v) \qquad \text{(Eqn. 12)}$$

A mask M: $\Omega \rightarrow \{0,1\}$ may map an undefined region of a goal image to 0 and the rest to 1. Mask M may be used to keep track of undefined regions of the goal image.

"Labeling" may refer to determining an input image from which a value for a pixel of the output image is to be obtained. For example, for each pixel of an output image corresponding to reference image $I_s$, a point within an input image of the light field that is a closes match for a goal disparity at that pixel as indicated at reference disparity G. An energy function over a discrete labeling l: $\delta \rightarrow \Gamma$ may be given by $E(l)=E_{data}(l)+kE_{smooth}(l)$, where $E_{data}(l)$ is a data term, $E_{smooth}(l)$ is a smoothness term, $\Omega \subset \mathbb{N}^2$ is the bounded domain of a captured image from the light field, and $\Gamma=\{1,\ldots,n\}$ is the set of indices of those images.

The data term may be formulated as follows:

$$p(x,s)=M(x)\lambda L(x,s)-I_s^*(x)\|_1 \qquad \text{(Eqn. 13)}$$

where L is the light field (e.g., as shown in FIG. 1(b)).

The smoothness term may be formulated as follows:

$$\tau(x,s)=\tau_u=\tau_v=|\partial_u L(x,s)+\partial_v L(x,s)|. \qquad \text{(Eqn. 14)}$$

The smoothness term may be a general form of a regularizer to enforce a piecewise smooth disparity map.

The resulting discrete energy may be defined as:

$$E^{(d)}(l) = \sum_{x \in \Omega} \rho(x, l(x)) + k \sum_{(x_i, x_j) \in N} \tau(x_i, l(x_i))|l(x_i) - l(x_j)|, \qquad \text{(Eqn. 15)}$$

where $(x_i, x_j)$ identifies a pixel of the output image, and k controls the regularization of the smoothness term.

In the case of a bijective goal disparity mapping, one can substitute the dual reference image $I_s^*$ in Equation 13 with Equation 12 to yield Equation 15, in which goal disparity G is fixed, and image index l is determined for each pixel (u, v):

$$E_{data}(l) = \sum_{(u,v) \in \Omega} M(u,v)\|L(u, v, l(u, v)) - L(u - G(u, v), v, \hat{s})\|_1. \qquad \text{(Eqn. 16)}$$

Figure 16:
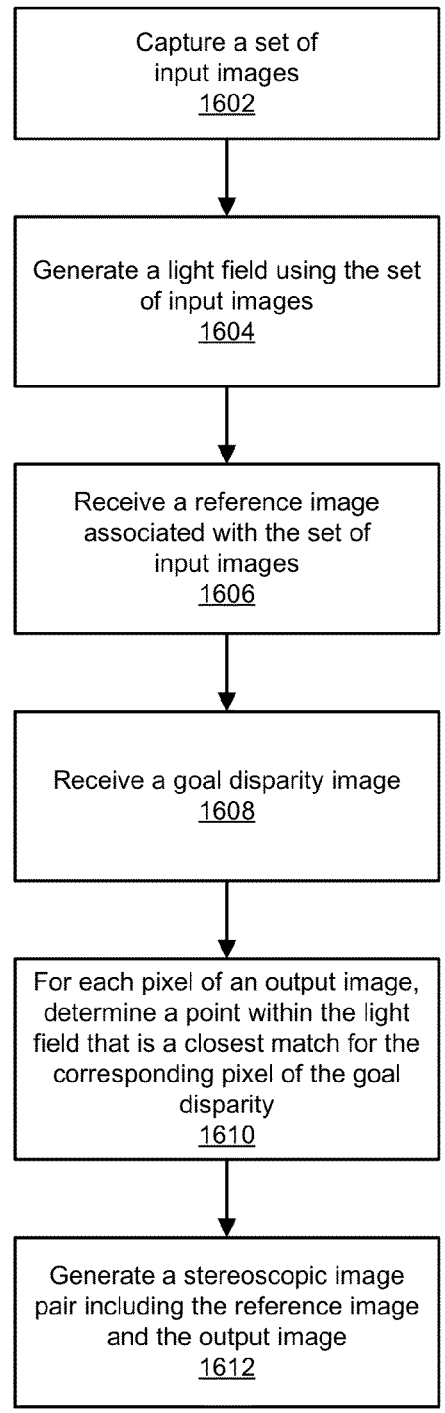
FIG. 16 illustrates a flow diagram for generating a stereoscopic image pair using a light field domain formulation.

FIG. 16 illustrates a flow diagram for generating a stereoscopic image pair using a light field domain formulation.

At operation 1602, a set of input images may be captured. Input images may be images of a scene captured from multiple perspectives. At operation 1604, a light field may be generated from the set of input images. Processes for capturing input images and generating a light field from the input images are described in detail above in the section "Image Generation from a Light Field."

At operation 1606, a reference image 1400 associated with the set of input images may be received. The reference image may be received at a computing system configured to generate stereoscopic image pairs. This computing system may be the same computing system used to generate the light field described with reference to operation 1604, or a different computing system may be used.

At operation 1608, a goal disparity image 1450 may be received by the computing system. The goal disparity image 1450 may be used to indicate a desired disparity at each pixel of reference image 1400.

At operation 1610, for each pixel of an output image, a point within an input image (as shown at FIG. 1(a)) of the light field (as shown at FIG. 1(b)) may be determined that is a closest match for the corresponding pixel of goal disparity image 1450. This can be achieved by minimizing an energy formulation, as outlined above.

At operation 1612, a stereoscopic image pair may be generated. The stereoscopic image pair may include the reference image and the output image. When the stereoscopic image pair is viewed, e.g., via stereoscopic viewing equipment such as 3D glasses, the stereoscopic image pair may appear to a viewer as a 3D image.

Continuous Formulation

In some embodiments, the labeling approach described above with reference to Equations 12-16 may be formulated as a continuous optimization problem. In comparison with a discrete approach to optimization, continuous optimization may require fewer brute force calculations and may consume less space in memory. The continuous optimization formulation described herein is sometimes coined as "embarrassingly parallel," as it can be implemented such that many simple operations can run in parallel on specialized hardware, such as a graphical processing unit (GPU). As a result, this approach may allow for leabling to be determined efficiently using a GPU. In contrast, a discrete graph cut method may contain fewer operations overall but may be more difficult to formulate in a parallel manner and consequently may not take advantage of the parallel processing capabilities of a GPU to the same extent as the continuous optimization formulation. It will be recognized that continuous optimization may also be applied to the disparity-domain approaches described above.

A label value determined using the continuous optimization approach may be a non-discrete value (e.g., image 2.2 from a set of input images 1-10). The label value determined using continuous optimization may be translated back to the discrete domain for determination of the output image, for example, by determining a discrete value that is closest to the determined value (e.g., when the determined value is image 2.2, use image 2).

In formulating labeling according to a continuous optimization approach, the image domain and the label may be continuous and labeling function $l:\Omega \to \Gamma$ may be treated as continuous, so that its gradient $\nabla l$ is defined. However, it may also be desirable that the labeling function can contain discontinuities, and in such cases the gradient may be defined in a distributional sense. This formulation may be a total variation formulation (see, e.g., [Rubinstein et al. 2008], [Chambolle et al. 2010]).

The discrete formulation indicated in Equation 15 may be defined on a two-dimensional lattice graph. The continuous version of the energy functional may be defined using a gradient $\nabla l$ as follows:

$$E(l)=\int_\Omega \rho(x,l(x))+k\tau(x,l(x))\|\nabla l\|_2 dx. \quad \text{(Eqn. 17)}$$

An $\ell^1$-norm or an $\ell^2$-norm (such as the total variation regularizer) may be used. The $\ell^2$-norm may be chosen for the smoothness term to eliminate grid bias present in the discrete formulation.

The continuous optimization may be a convex formulation, making the methods from convex analysis available and allowing for more efficient minimization. To make the energy functional convex, the problem may be lifted by an extra dimension to represent the unknown labeling function $\mathbf{1}(x)$ in terms of its level sets. See, e.g., [Pock et al. 2008], [Pock et al. 2010].

In [Pock et al. 2010], a binary function $\phi: [\Omega \times \Gamma] \to \{0,1\}$ is defined such that:

$$\phi(x,\gamma) = \begin{cases} 1 & \text{if } l(x) > \gamma \\ 0 & \text{otherwise} \end{cases} \quad \text{(Eqn. 18)}$$

The feasible set of functions $\phi$ may be defined as: $D'=\{\phi: [\Omega \times \Gamma] \to \{0,1\} \phi\{x,1\}=1, \phi\{x,n\}=0\}$, and may be further relaxed so that the feasible set D is the convex hull of D'. When $\phi$ is projected back to its original domain, it may be simply thresholded. Its optimality may still be guaranteed regardless of the value of the threshold. The functional may be rewritten in terms of $\phi$ in the lifted domain as follows.

Without spatially varying weighting, the smoothness term may be reformulated following the generalized co-area formular of [Fleming and Rishel 1960]:

$$\int_\Omega \|\nabla l(x)\|_2 dx = \int_\Omega \int_\Gamma \|\nabla_x \phi(x,\gamma)\|_2 d\gamma dx \quad \text{(Eqn. 19)}$$

Weighting function $\tau(x,s)$ may be accounted for as approximated in the following:

$$\int_\Omega \tau(x,l(x)) \|\nabla l(x)\|_2 dx \approx \int_\Omega \int_\Gamma \tau(x,\gamma) \|\nabla_x \phi(x,\gamma)\|_2 d\gamma dx \quad \text{(Eqn. 20)}$$

Here, the discrepancy arises through integration over all in-between weights spanning two labelings where the neighborhood contains jumps greater than one label.

The data term may be rewritten using the partial derivative of an indicator function (see, e.g., [Pock et al. 2008]).

$$\int_\Omega \rho(x,l(x)) dx = \int_\Omega \int_\Gamma \rho(x,\gamma) |\partial_\gamma \phi(x,\gamma)| d\gamma dx \quad \text{(Eqn. 21)}$$

The following reformulated energy functional may be minimized for a function $\phi \in D$:

$$E(\phi) = \int_\Omega \int_\Gamma \rho(x,\gamma) |\partial_\gamma \phi(x,\gamma)| + k\tau(x,\gamma) \|\nabla_x \phi(x,\gamma)\|_2 d\gamma dx. \quad \text{(Eqn. 22)}$$

The resulting labeling function l may be recovered from $\phi$ by integrating it over $\Gamma$ (see, e.g., [Chan et al. 2006]):

$$l(x) = 1 + \int_\Gamma \phi(x,\gamma) d\gamma. \quad \text{(Eqn. 23)}$$

The convex energy functional of Equation 22 may be minimized by solving its associated Euler-Lagrange differential equation. However, to avoid the singularity of the norms at zero, the norms may be rewritten in terms of their Wulff shape as the combined two norms constitute a convex, positively 1-homogenous function (see, e.g., [Zach et al. 2009]).

A Wulff shape is defined as:

$$W\phi = \{y \in \mathbb{R}^N : \langle y, x \rangle \le \phi(x) \forall x \in \mathbb{R}^n\} \quad \text{(Eqn. 24)}$$

for a convex function $\phi: \mathbb{R}^n \to \mathbb{R}$ that is positively 1-homogeneous, i.e., $\phi(\lambda x) = \lambda \phi(x) \forall \lambda > 0$. It is a closed and bounded convex set containing zero, and is used to rewrite $\phi$ as $$\phi(x) = \max \langle x, y \rangle$$

$$y \in W_\phi \quad \text{(Eqn. 25)}$$

where the norms can be represented in a differentiable form. The functional of Equation 22 can then be rewritten as $$\min_{\phi \in D} \max_{p \in C} \int_\Omega \int_\Gamma \langle \nabla_{x,y} \phi(x,\gamma), p(x,\gamma) \rangle d\gamma dx, \quad \text{(Eqn. 26)}$$

Where $\nabla_{x,y}$ is now the gradient over all three dimensions of $\phi$ and $p=(p_1, p_2, p_3)^T$ is the dual variable. The feasible set of the dual then becomes the following Wulff shape:

$$C = \left\{ p : [\Omega \times \Gamma] \to \mathbb{R}^3 \,\middle|\, \sqrt{p_1(x,\gamma)^2 + p_2(x,\gamma)^2} \le kp(x,\gamma), \right. \quad \text{(Eqn. 27)}$$

$$\left. |p_3(x,\gamma)| \le D(x,\gamma) \right\}.$$

This can be seen a partial dualization in convex analysis, where $\phi$ is referred to as the primal variable and p the dual. Because the formulation of Equation 26 may be maximized in the dual p and minimized in primal $\phi$, Equation 26 may be referred to as a saddle-point formulation.

Equation 26 may be solved by alternating taking the gradient steps between the primal and the dual. See, e.g., [Handa et al. 2011] To minimize the primal, the gradient may be defined as $$\frac{\phi^n - \phi^{n+1}}{\sigma_p} = \nabla_\phi E(\phi, p), \quad \text{(Eqn. 28)}$$

And to maximize the dual, the gradient may be defined as:

$$\frac{p^{n+1} - p^n}{\sigma_p} = \nabla_\phi E(\phi, p). \quad \text{(Eqn. 29)}$$

The update steps may then be derived by calculating the derivative of Equation 26 with respect to the primal and the dual, and this yields the following iterative update steps:

Primal: $\phi^{n+1} = P_D(\phi^n + \sigma \operatorname{div} P^n)$, (Eqn. 30)

Dual: $p^{n+1} = P_C(p^n + \sigma \nabla \phi^{k+1})$. (Eqn. 31)

$P_D$ projects $\phi$ back into its domain D by thresholding it to $\{0,1\}$ and setting $\phi(x,1)=1$ and $\phi(x,n)=0$. $P_C$ is the Euclidean projector of the set C (see, e.g., [Pock et al. 2008]):

$$P_C(p^{n+1}) = \min_{y \in C} \|p^{n+1} - y\| \quad \text{(Eqn. 32)}$$

To compute $\Omega$ and F numerically, $\Omega$ and $\Gamma$ may be discretized so that they have the pixel coordinates and the image index in the light field, respectively. The primal and dual may be treated as vectors of length n=width×depth×height (in light field terms) and the individual gradients can be expressed as one n×n sparse matrix. The gradients may be approximated using the forward differences. The backward difference may be used for the divergence to ensure convergence.

Hardware Example

Figure 17:
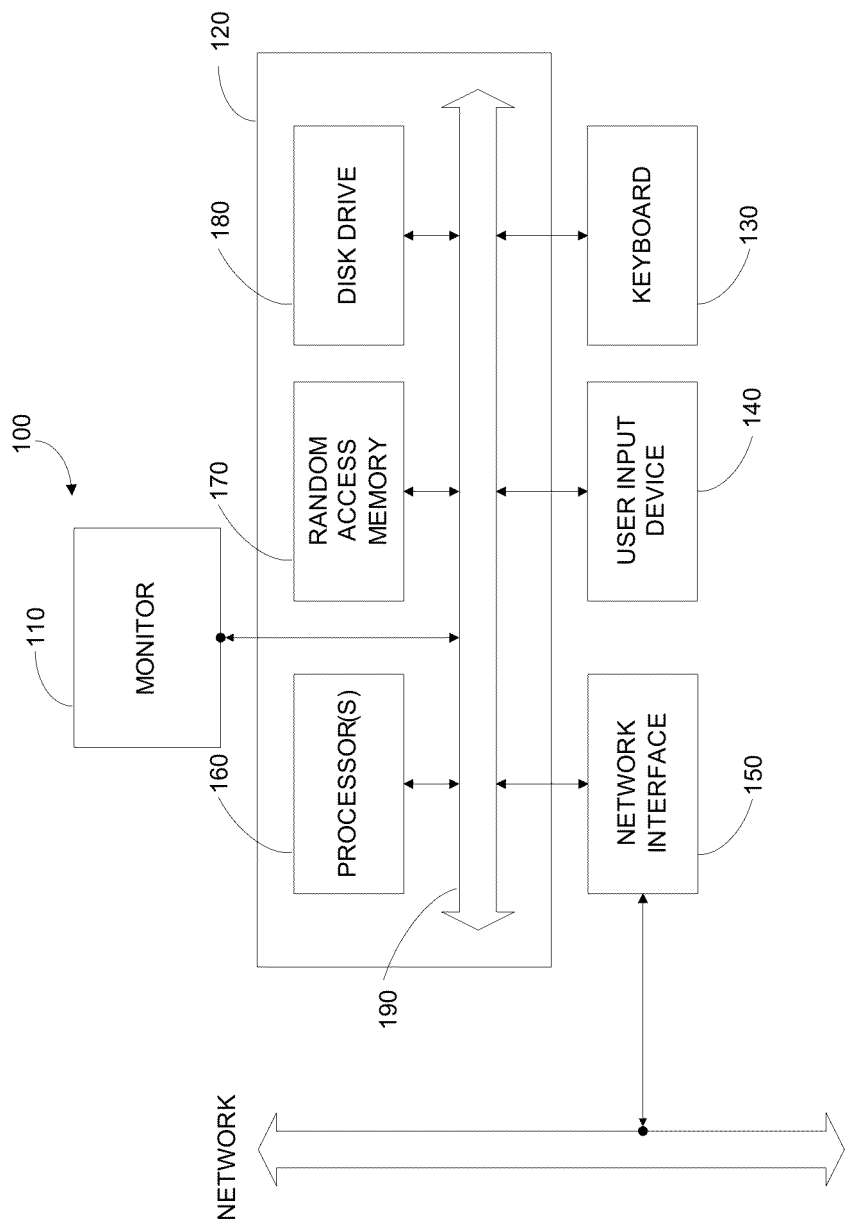
FIG. 17 illustrates an example hardware setup for performing techniques described herein.

FIG. 17 illustrates an example system 100 for animation management according to an embodiment of the present invention. In the presently described embodiment, computer system 100 typically includes a monitor 110, computer 120, a keyboard 130, a user input device 140, computer interfaces 150, and the like. Images and frames can be generated, stored in memory or hard disk storage, and processed. The interfaces and/or memory might also be used to provide the metadata about an image, objects in the virtual space and other considerations.

In various embodiments, display/monitor 110 may be embodied as a CRT display, an LCD display, a plasma display, a direct-projection or rear-projection DLP, a microdisplay, or the like. In various embodiments, monitor 110 may be used to visually display images, or the like, as well as being part of an interactive environment.

In the present embodiment, user input device 140 is typically embodied as a computer mouse, a trackball, a track pad, a joystick, wireless remote, drawing tablet, voice command system, eye tracking system, and the like. Embodiments of network interface 150 typically include an Ethernet card, a modem (telephone, satellite, cable, ISDN), (asynchronous) digital subscriber line (DSL) unit, FireWire interface, USB interface, and the like. For example, network interface 150 may be coupled to a computer network, to a FireWire bus, or the like. In other embodiments, network interface 150 may be physically integrated on the motherboard of computer 120 and/or include software drivers, or the like.

In various embodiments, computer 120 typically includes familiar computer components such as a processor 160, and memory storage devices, such as a random access memory (RAM) 170, disk drives 180, and system bus 190 interconnecting the above components. RAM 170 or other memory might hold computer instructions to be executed by one or more processors as a mechanism for effecting some functionality described herein that is implemented in software. In one embodiment, computer 120 includes one or more Core™ microprocessors from Intel. Further, in the present embodiment, computer 120 typically includes a UNIX-based operating system.

RAM 170 and disk drive 180 are examples of computer-readable tangible media configured to store embodiments of the present invention including computer-executable code implementing techniques described herein, data such as image files, object/scene models including geometric descriptions of virtual objects, images, camera paths, procedural descriptions, a rendering engine, executable computer code, and/or the like. Other types of tangible media may include magnetic storage media such as floppy disks, networked hard disks, or removable hard disks, optical storage media such as CD-ROMS, DVDs, holographic memories, and/or bar codes, semiconductor memories such as flash memories, read-only-memories (ROMS), battery-backed volatile memories, networked storage devices, and the like.

In various embodiments, computer system 100 may also include software that enables communications over a network such as the HTTP, TCP/IP, RTP/RTSP protocols, and the like. In alternative embodiments of the present invention, other communications software and transfer protocols may also be used, for example IPX, UDP or the like.

In some embodiments of the present invention, a graphical processor unit or "GPU", may be used to accelerate various operations. Such operations may include determining image rendering, camera movements, view alterations, camera paths or other processes.

FIG. 17 is representative of a computer system capable of embodying the present invention. It will be readily apparent to one of ordinary skill in the art that many other hardware and software configurations are suitable for use with the present invention. For example, the computer may be a desktop, portable, rack-mounted or tablet configuration. Additionally, the computer may be a series of networked computers. Further, the use of other microprocessors are contemplated, such as Xeon™, Pentium™ or Itanium™ microprocessors from Intel; Turion™ 64 or Opteron™ microprocessors from Advanced Micro Devices, Inc.; and the like. Further, other types of operating systems are contemplated, such as Vista™ or Windows XP™ or the like from Microsoft Corporation, Solaris™ from Sun Microsystems, Linux, Unix, or the like. In still other embodiments, the platform is a gaming system, such as Microsoft's Xbox 360™ game console, Sony's Playstation 3™ console, or Nintendo's Wii™ console.

In still other embodiments, the techniques described above may be implemented upon a chip or an auxiliary processing board. Many types of configurations for computational devices can be used to implement various methods described herein. Further, processing components having different levels of computational power, e.g., microprocessors, graphics processors, RISC processors, embedded processors, or the like can also be used to implement various embodiments.

As has now been described, methods and systems for generating stereoscopic content with per-pixel control over disparity based on multi-perspective imaging from light fields are provided. This might find uses in many fields. Merely by way of example, stereoscopic post-processing of a captured live action movie, scene composition modification of computer generated image content without requiring a change of scene geometry, for single view rendering of moving all or part of scene objects with occlusion and disocclusion handled in a proper way, for rendering views for multi-view autostereoscopic displays, and/or for advanced 2D movie editing effects. For instance, a cut/transitition between two scenes, where one first replaces the background and then the foreground or vice versa (e.g., the actors from the previous scene remain visible, while the whole rest of the scene is gradually replaced, might be a situation where some of the teaching herein might find a use. With light field cut computation, one could selectively mix light rays of two or more different scenes and compose them together.

As described herein, per-pixel disparity control can be obtained, at least by synthesizing the entire output images from the light rays sampled in a light field. A mathematically valid framework is provided to locate each light ray needed to synthesize output images. The image generation can be configured to be represented by a statement of an optimization problem, which can then be solved by standard solvers.

Unlike other approaches, all operations might be done in the output images space, so that information loss and sampling issues are minimized, spatial distortion caused by insufficient input data is eliminated or reduced. Handling can then fully exploit a light field without a limitation on the number of output views. In some cases, an additional degree of freedom for the selection of rays is provided, which allows a vertical image column to be synthesized from multiple views. A more sophisticated ray selection strategy to cope with the visual smoothness through the optimization is then possible. In some embodiments, image generation can employ arbitrary disparity constraints.

Further embodiments can be envisioned to one of ordinary skill in the art after reading this disclosure. In other embodiments, combinations or sub combinations of the above disclosed invention can be advantageously made. The example arrangements of components are shown for purposes of illustration and it should be understood that combinations, additions, rearrangements, and the like are contemplated in alternative embodiments of the present invention. Thus, while the invention has been described with respect to exemplary embodiments, one skilled in the art will recognize that numerous modifications are possible.

For example, the processes described herein may be implemented using hardware components, software components, and/or any combination thereof. The specification and drawings are, accordingly, to be regarded in an illustrative rather than a restrictive sense. It will, however, be evident that various modifications and changes may be made thereunto without departing from the broader spirit and scope of the invention as set forth in the claims and that the invention is intended to cover all modifications and equivalents within the scope of the following claims.

What is claimed is:

1. A computer-implemented method for generating stereoscopic content from a three-dimensional (3D) representation of a light field representing virtual or actual light rays from a scene, wherein the 3D representation is readable in electronic form, the method comprising:
    receiving a 3D representation of the light field;
    obtaining a reference image that is included in the 3D representation of the light field;
    receiving a goal disparity image that indicates a goal binocular disparity for one or more pixels of the reference image;
    generating a dual reference image by shifting the reference image using the goal disparity image;
    for each pixel of an output image corresponding to the reference image:
        determining a point within the light field that is a closest match for the goal binocular disparity of a corresponding pixel of the goal disparity image by optimizing an energy function that compares the dual reference image and the 3D representation of the light field wherein the energy function comprises a sum of a data term and a smoothness term, wherein the data term calculates a normed difference of the dual reference image and the light field; and
    generating, using the computer, a stereoscopic image pair comprising the reference image and the output image.

2. The method of claim 1, wherein the energy function has a discrete formulation.

3. The method of claim 1, wherein the energy function has a continuous formulation.

4. The method of claim 3, wherein the continuous energy function has a convex continuous formulation.

5. The method of claim 3, wherein the optimization is performed using a graphical processing unit (GPU).

6. The method of claim 1, wherein the goal binocular disparities of the goal disparity image are determined in response to user input.

7. The method of claim 1, wherein the goal binocular disparities of the goal disparity image are determined by a computer system.

8. The method of claim 1, wherein the 3D representation of the light field is generated from the scene using a set of input images.

9. The method of claim 8, wherein the set of input images includes perspective images.

10. The method of claim 8, wherein the set of input images are acquired using at least 2D subsets of one or more representations of a light field with three or higher dimensions, a camera mounted onto a linear stage, a linear camera array, microlens array, or corresponding rendering of virtual scenes.

11. A computer-implemented system comprising:
    one or more data processors; and
    one or more non-transitory computer-readable storage media containing instructions configured to cause the one or more processors to perform operations including:
        receiving a 3D representation of the light field;
        obtaining a reference image that is included in the 3D representation of the light field;
        receiving a goal disparity image that indicates a goal binocular disparity for one or more pixels of the reference image;
        generating a dual reference image by shifting the reference image using the goal disparity image;
        for each pixel of an output image corresponding to the reference image:
            determining a point within the light field that is a closest match for the goal binocular disparity of a corresponding pixel of the goal disparity image by optimizing an energy function that compares the dual reference image and the 3D representation of the light field wherein the energy function comprises a sum of a data term and a smoothness term, wherein the data term calculates a normed difference of the dual reference image and the light field; and
        generating a stereoscopic image pair comprising the reference image and the output image.

12. The system of claim 11, wherein the energy function has a discrete formulation.

13. The system of claim 11, wherein the energy function has a continuous formulation.

14. The system of claim 13, wherein the continuous energy function has a convex continuous formulation.

15. The system of claim 13, wherein the optimization is performed using a graphical processing unit (GPU).

16. The system of claim 11, further comprising a user input device communicatively coupled to the one or more data processors, wherein the goal binocular disparities of the goal disparity image are determined in response to user input received via the user input device.

17. The system of claim 11, further comprising instructions configured to cause the one or more processors to perform operations including determining the goal binocular disparities of the goal disparity image.

18. A non-transitory computer-readable medium containing program code that, when executed by a computer, generate stereoscopic content from a three-dimensional (3D) representation of a light field, the program code comprising:

program code for receiving a 3D representation of the light field;

program code for obtaining a reference image that is included in the 3D representation of the light field;

program code for receiving a goal disparity image that indicates a goal binocular disparity for one or more pixels of the reference image;

program code for generating a dual reference image by shifting the reference image using the goal disparity image;

program code for determining, for each pixel of an output image corresponding to the reference image, a point within the light field that is a closest match for the goal binocular disparity of a corresponding pixel of the goal disparity image by optimizing an energy function that compares the dual reference image and the 3D representation of the light field wherein the energy function comprises a sum of a data term and a smoothness term, wherein the data term calculates a normed difference of the dual reference image and the light field; and program code for generating a stereoscopic image pair comprising the reference image and the output image.

19. The non-transitory computer-readable medium of claim 18, wherein the energy function has a discrete formulation.

20. The non-transitory computer-readable medium of claim 18, wherein the energy function has a continuous formulation.

21. The non-transitory computer-readable medium of claim 20, wherein the continuous energy function has a convex continuous formulation.

22. The non-transitory computer-readable medium of claim 18, wherein the optimization is performed using a graphical processing unit (GPU).

* * * * *